United States Patent [19]
Brandt et al.

[11] Patent Number: 6,125,384
[45] Date of Patent: *Sep. 26, 2000

[54] COMPUTER APPARATUS AND METHOD FOR COMMUNICATING BETWEEN SOFTWARE APPLICATIONS AND COMPUTERS ON THE WORLD-WIDE WEB

[75] Inventors: Marcia Lynn Brandt; Kenneth Edgar Brown, both of Rochester; Pernell James Dykes, Byron; Erik Duane Lindberg; Diane Elaine Olson, both of Rochester, all of Minn.; Jeffrey Edward Selden, Jacksonville Beach, Fla.; Devon Daniel Snyder; James Orrin Walts, both of Rochester, Minn.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/780,013

[22] Filed: Dec. 23, 1996

[51] Int. Cl.[7] .................................................. G06F 15/16
[52] U.S. Cl. ........................................... 709/203; 709/249
[58] Field of Search ....................... 395/200.33, 200.31; 707/9; 709/203, 201, 249

[56] References Cited

U.S. PATENT DOCUMENTS

| 5,754,772 | 5/1998 | Leaf ................................. 395/200.33 |
|---|---|---|
| 5,761,673 | 6/1998 | Bookman et al. ........................ 707/104 |
| 5,778,178 | 7/1998 | Arunachalam ...................... 395/200.33 |
| 5,793,964 | 8/1998 | Rogers et al. ...................... 395/200.32 |
| 5,793,972 | 8/1998 | Shane ................................ 395/200.49 |
| 5,802,518 | 9/1998 | Karaev et al. ............................. 707/9 |
| 5,828,840 | 10/1998 | Cowan et al. ...................... 395/200.33 |
| 5,872,915 | 2/1999 | Dykes et al. ....................... 395/188.01 |
| 5,892,905 | 4/1999 | Brandt et al. ....................... 395/187.01 |

OTHER PUBLICATIONS

WebSite API 1.1 SDK Introduction and Overview http://solo.dc3.com/wsapi/index.htm, Apr. 13, 1996.

*Primary Examiner*—Mehmet B. Geckil
*Attorney, Agent, or Firm*—Schmeiser, Olsen & Watts

[57] ABSTRACT

A computer system and method provides access to a software application from a web browser over the world-wide web (WWW). The system includes one or more computers executing a web browser, a web server application, an application gateway, and a software application. The system and method allows a user of the web browser to access the software application. The user inputs data via the web browser, which is communicated to the web server application. The web server application authenticates the web browser and passes appropriate input data to an application gateway, including data to uniquely identify and track the user's request. The application gateway then performs the function requested in the web server input data by formatting the appropriate commands with the software application. The software application responds by outputting data to the application gateway that includes an identifier that the application gateway uses to match the output data with the web browser that requested the output data. This system thus allows numerous web browsers access to the software application simultaneously.

36 Claims, 18 Drawing Sheets

```
<html>
<title>Cars Around the World<title/>
<FORM ACTION="/cgi-prot/exmp5cgi.exe" METHOD="POST">
<H3>Rental Reservation</H3>
<HR>
Enter the following information and then press submit:
<HR>
<p>Member number:    <INPUT TYPE="text" NAME="membno" SIZE=4>
<p>Name:      Last:   <INPUT TYPE="text" NAME="lname" SIZE=15>
              First:  <INPUT TYPE="text" NAME="fname" SIZE=15>
              MI:     <INPUT TYPE="text" NAME="mi" SIZE=1>
<HR>
<P>Origin City:  <INPUT TYPE="text" NAME="origcity" SIZE=15>
       State:    <INPUT TYPE="text" NAME="origstate" SIZE=2>
<P>Start Date (MM/DD.YY): <INPUT TYPE="text" NAME="startdate" SIZE=8>
       Number of days <INPUT TYPE="text" NAME="days" SIZE=3>
<P>Select Car Preference:
       <INPUT TYPE="radio" NAME="cartype" VALUE=1> Compact
       <INPUT TYPE="radio" NAME="cartype" CHECKED VALUE=2> Mid Size
       <INPUT TYPE="radio" NAME="cartype" VALUE=3> Full Size
       <INPUT TYPE="radio" NAME="cartype" VALUE=4> Luxury
<HR>
<P><INPUT TYPE="submit" VALUE="Submit">
<P><INPUT TYPE="hidden" NAME="wf-cgi-submit" VALUE="2">
<P><INPUT TYPE="hidden" NAME="wf-api-proc-template" VALUE="www_Reservation Request">
<INPUT TYPE="hidden" NAME="wf-fmig-key" VALUE="webfmcust">
<INPUT TYPE="hidden" NAME="wf-cgi-html" VALUE="/exm/smp/exmp5srk.htm">
</form>
</html>
```

FIG. 8

```
membno=1234&lname=Doe&fname=John&mi=E&origcity=Nevade&origstate=IA&startdate=09%2F23%
2F96&days=4&cartype=2&wf-cgi-submit=2&wf-api-proc-template=www_Reservation_Request&wf-fmig-
key=webfmcust&wf-cgi-html=%2Fexm%2Fsmp%2Fexmp5srk.htm.
```

FIG. 9

```
<html>
<title>Cars Around the World<title/>
<FORM ACTION="/cgi-prot/exmp5cgi.exe" METHOD="POST">
<H3><CENTER>Customer's Reservation Number</CENTER></H3>
<HR>
<p> <! - - "wf-act-outmsg" - ->
<HR>
<p><INPUT TYPE="submit" VALUE="OK">
<p><INPUT TYPE="hidden" NAME="wf-cgi-submit" VALUE="13">
</form>
</html>
```

FIG. 10

```
<html>
<title>Cars Around the World<title/>
<body>
<FORM ACTION="/cgi-prot/exmp5cgi.exe" METHOD="POST">
<H3><CENTER>Customer's Reservation Number</CENTER></H3>
<HR>
<p> Your reservation number is 4411. </p>
<HR>
<p><INPUT TYPE="submit" VALUE="OK">
<p><INPUT TYPE="hidden" NAME="wf-cgi-submit" VALUE="13">
<INPUT TYPE="hidden" NAME="wf-fmig-handle" VALUE="007777775F52657365 72766174696F">
<INPUT TYPE="hidden" NAME="wf-fmig-key" VALUE="webfmcust">
</form>
</html>
```

FIG. 11

```
wf-cgi-submit=13&wf-fmig-handle=007777775F52657365 72766174696F8wf-fmig-key=webfmcust
```

FIG. 12

```html
<html>
<FORM ACTION="/cgi-prot/exmp5cgi.exe" METHOD="POST">
<HEAD>
<title>IBM Internet Connection for FlowMark home page</title>
</HEAD>
<BODY>
<h3>
IBM Internet Connection for FlowMark home page
</h3>
<hr>
<h4>
Enter key, select next screen, then press the submit button.
</h4>
<strong>
Key:
</strong>
<INPUT TYPE="text" NAME="wf-fmig-key" SIZE=64>
<br>
<INPUT TYPE="radio" NAME="wf-cgi-html" VALUE="/exm/html/exmp5ewi.htm" CHECKED>
<IMG SRC="/exm/icons/exmp5ewi.gif" ALIGN=MIDDLE HSPACE=5>Work with Work Items
<br>
<INPUT TYPE="radio" NAME="wf-cgi-html" VALUE="/exm/html/exmp5epi.htm">
<IMG SRC="/exm/icons/exmp5epi.gif" ALIGN=MIDDLE HSPACE=5>Work with Process Instances
<br>
<INPUT TYPE="radio" NAME="wf-cgi-html" VALUE="/exm/html/exmp5ept.htm">
<IMG SRC="/exm/icons/exmp5ept.gif" ALIGN=MIDDLE HSPACE=5>Work with Process Templates <!-- Start Submit Button & hidden variables --------------->

<hr>
<INPUT TYPE="submit" VALUE="Submit">
<INPUT TYPE="hidden" NAME="wf-cgi-submit" VALUE="0">

<!-- End Submit Button & hidden variables --------------->
<br>
<b>
[
<a href="/exm/docs/exmp5d20.htm">Help |
<a href=http://www.ibm.com/">IBM home page</a>> |
<a href=http://www.software.ibm.com/ad/flowmark/exmn0mst.htm">FlowMark home page</a>
]

</FORM>
</BODY>
```

FIG. 13

```
wf-fmig-key=webfmagent&wf-cgi-html=%2Fexm%2Fhtml%2Fexmp5ewi-htm&wf-cgisubmit=0
```

FIG. 14

```
<html>
<FORM ACTION="/cgi-prot/exmp5cgi.exe" METHOD="POST">
<HEAD>
<title>FlowMark - Work Items,/titile>
</HEAD>
<BODY>
<img src="/exm/icons/exmp5eww.gif" alt=Work with Work Items>
<h4>Select a work item:</h4>
<TABLE BORDER=1>
<tr>
        <th COLSPAN=2>Description
        <th>Status
        <th>Activity name
        <th>Process
        <th>Program
        <th>Received<br>date & time
        <th>Priority
        <th>Category
<! - - "wf-cgi-rbegin" - - >
<tr>
        <td ALIGN=CENTER VALIGN=MIDDLE><INPUT TYPE="radio"
            NAME="wf-api-item" VALUE="wf-api-item-id">
        <td> NOWRAP><! - - "wf-api-item-descrip" - - >
        <td><! - - "wf-api-item-state" - - >
        <td><! - - "wf-api-item-name" - - >
        <td><! - - "wf-api-item-procinst" - - >
        <td><! - - "wf-api-item-impl" - - >
        <td ALIGN=CENTER><! - - "wf-api-item-starttime" - - >
        <td ALIGN=CENTER><! - - "wf-api-item-priority" - - >
        <td><! - - "wf-api-item-category" - - >
<! - - "wf-cgi-rend" - - >
</TABLE>

<hr>
<h4>Next, select which action you want to perform and
<br>
press the button below.
</h4>

<TABLE BORDER=0>
<tr>
<td>
<INPUT TYPE="radio" NAME="wf-cgi-submit" VALUE="3" CHECKED>
Start work item
<tr>
<td>
```

FIG. 15a

```
<INPUT TYPE="radio" NAME="wf-cgi-submit" VALUE="0">
Refresh list
</TABLE>
<!-- Start Submit Button & hidden variables --------------->
<hr>
<INPUT TYPE="submit" VALUE="Perform Action">
<INPUT TYPE="hidden" NAME="wf-cgi-html" VALUE="/exm/html/exmp5ewi.htm">
<!-- End Submit Button & hidden variables --------------->
<hr>
<aref="/exm/html/exmp5ehp.htm">
<img src="/exm/icons/exmp5efm.gif" ALIGN=MIDDLE HSPACE=5>
Return to home page
</a>
<aref="/exm/html/exmp5d20.htm">
<img src="/exm/icons/exmp5eoh.gif" ALIGN=MIDDLE HSPACE=5>
Help
</a>
<hr>
<TABLE BORDER=1>
<tr>
<td>FlowMark User
<td>FlowMark Database
<td>FlowMark Server
<td>Date & Time
<tr>
<td><!-- "wf-api-fmuser" -->
<td><!-- "wf-api-fmdb" -->
<td><!-- "wf-api-fmserver" -->
<td><!-- "wf-api-datetime" -->
</table>
</FORM>
</BODY>
</HTML>
```

FIG. 15 b

```html
<html>
<FONT SIZE=3>
<FORM ACTION="/cgi-prot/exmp5cgi.exe" METHOD="POST">
<HEAD>
<title>FlowMark - Work Items</title>
</HEAD>
<BODY>
<img src="/exm/icons/exmp5eww.gif" alt=Work with Work Items>
<h4>Select a work item:</h4>
<TABLE BORDER=1>
<tr>
        <th COLSPAN=2>Description
        <th>Status
        <th>Activity name
        <th>Process
        <th>Program
        <th>Received<br>date & time
        <th>Priority
        <th>Category
<! - - "wf-cgi-rbegin" - - >
<tr>
        <td ALIGN=CENTER VALIGN=MIDDLE><INPUT TYPE="radio"
NAME="wf-api-item"
VALUE="7777775F5363686564756C655F5265736572766174696F6E007777775F52657365727661
74696F6E5F526571756573745F383500454D4147454E54007656261676566E7400776562666D616
7656E74">
        <td> NOWRAP>Schedule car
        <td>Ready
        <td>www_Schedule_Reservation
        <td>www_Reservation Request_85
        <td>Schedule_Reservation
        <td ALIGN=CENTER>09-03-1996 02:55:11PM
        <td ALIGN=CENTER>4004128
        <td>
<tr>
        <td>ALIGN=CENTER VALIGN=MIDDLE><INPUT TYPE="radio"
NAME="wf-api-item"
VALUE="7777775F5363686564756C655F5265736572766174696F6E007777775F52657365727661
74696F6E5F526571756573745F383500454D4147454E54007656261676566E7400776562666D616
7656E74">
        <td> NOWRAP>Schedule car
        <td>Ready
        <td>www_Schedule_Reservation
        <td>www_Reservation Request_84
        <td>Schedule_Reservation
        <td ALIGN=CENTER>09-03-1996 01:48:48PM
        <td ALIGN=CENTER>4004128
        <td>
<tr>
        <td>ALIGN=CENTER VALIGN=MIDDLE><INPUT TYPE="radio"
```

FIG. 16a

```
NAME="wf-api-item"
VALUE="7777775F5363686564756C655F52657365727661 74696F6E007777775F52657365727661
74696F6E5F526571756573745F383500454D4147454E54007765626167656E7400776562666D616
7656E74">
        <td> NOWRAP>Schedule car.
        <td>Ready
        <td>www_Schedule_Reservation
        <td>www_Reservation Request_86
        <td>Schedule_Reservation
        <td ALIGN=CENTER>09-03-1996 03:01:15PM
        <td ALIGN=CENTER>4004128
        <td>
<!- - "wf-cgi-rend" - - >
</TABLE>
<hr>
<h4>Next, select which action you want to perform and
<br>
press the button below.
</h4>
<TABLE BORDER=0>
<tr>
<td>
<INPUT TYPE="radio" NAME="wf-cgi-submit" VALUE="3" CHECKED>
Start work item
<tr>
<td>
<INPUT TYPE="radio" NAME="wf-cgi-submit" VALUE="0">
Refresh list
</TABLE>
<!- - Start Submit Button & hidden variables - - - - - - - - - - - - - - - >
<hr>
<INPUT TYPE="submit" VALUE="Perform Action">
<INPUT TYPE="hidden" NAME="wf-cgi-html" VALUE="/exm/html/exmp5ewi.htm">
<!- - End Submit Button & hidden variables - - - - - - - - - - - - - - - >
<hr>
<ahref="/exm/html/exmp5ehp.htm">
<img src="/exm/icons/exmp5efm.gif" ALIGN=MIDDLE HSPACE=5>
Return to home page
</a>
<ahref="/exm/html/exmp5d20.htm">
<img src="/exm/icons/exmp5eoh.gif" ALIGN=MIDDLE HSPACE=5>
Help
</a>
<hr>
```

FIG. 16b

```
<TABLE BORDER=1>
<tr>
<td>FlowMark User
<td>FlowMark Database
<td>FlowMark Server
<td>Date & Time
<tr>
<td>FMAGENT
<td>WWWDB
<td>WWWSRV
<td>08:27:33 09/05/96
</table>
<INPUT TYPE="hidden" NAME="wf-fmig-key" VAULE="webfmagent">
</FORM>
</BODY>
</HTML>
```

FIG. 16c

```
wf-api-item="7777775F5363686564756C655F5265736572766174696F6E007777775F52657365
72766174696F6E5F5265571756573745F383500454D4147454E54007765626167656E7400776562
666D6167656E74"&wf-cgi--submit=3&wf-cgi-html=%2Fexm%2Fhtml%2Fexmp5ewi.htm&wf-fmig-
key=webfmagent
```

FIG. 17

```
<HTML>
<FORM ACTION="/cgi-prot/exmp5cgi.exe" METHOD="POST">
<HEAD>
<TITLE>Customer Information</TITLE>
<B>Customer Reservation Information</B>
<table border=1>
<tr><td>Name</td><td>Member Number</td><td>Resv Number</td>
<tr><td ><!- - "wf-act-name" - - ></td>
<td align=right>"wf-act-membno"</td>
<td align=right>"wf-act-resvno"</td>
</table>
<p><!- - "wf-act-outmsg" - - >
<HR>
<B>Move An Available Ca</B>
<P><INPUT TYPE="radio" NAME=cars CHECKED> <!- - "wf-act-car1" - - >
<P><INPUT TYPE="radio" NAME=cars > <!- - "wf-act-car2" - - >
<P><INPUT TYPE="radio" NAME=cars > <!- - "wf-act-car3" - - >
<P><INPUT TYPE="radio" NAME=cars > <!- - "wf-act-car4" - - >
<HR>
<INPUT TYPE="submit" NAME="move"  VALUE="Move Car">
<INPUT TYPE="submit" NAME="cancel" VALUE="Cancel">
<INPUT TYPE="hidden" NAME="wf-cgi-submit" VALUE="13">
</FORM>
</HTML>
```

FIG. 18

```
<HTML>
<FORM ACTION="/cgi-prot/exmp5cgi.exe" METHOD="POST">
<HEAD>
<TITLE>Customer Information</TITLE>
<B>Customer Reservation Information</B>
<table border=1>
<tr><td>Name</td><td>Member Number</td><td>Resv Number</td>
<tr><td >John E. Doe</td>
<td align=right>1234</td>
<td align=right>4412</td>
</table>
<p>Reservation Date: <B>09/24/96</B> Days Requested:
<B>4</B><P>Car Type Requested: <B>Luxery</B><P>Origin: <B>Nevada, IA</b>
<HR>
<B>Move An Available Ca</B>
<P><INPUT TYPE="radio" NAME=cars CHECKED>  XYD123    Pontiac Grand Am
<P><INPUT TYPE="radio" NAME=cars >Chevy Camaro Z28
<P><INPUT TYPE="radio" NAME=cars >Chevrolet Lumina
<P><INPUT TYPE="radio" NAME=cars >Oldmobile Cutlass Supreme
<HR>
<INPUT TYPE="submit" NAME="move"  VALUE="Move Car">
<INPUT TYPE="submit" NAME="cancel"  VALUE="Cancel">
<INPUT TYPE="hidden" NAME="wf-cgi-submit"  VALUE="13">
<INPUT TYPE="hidden" NAME="wf-fmig-handle"
VALUE="7777775F4361725F556E617661696C61626C65007777775F52657365572766174696F6E5F526571756573745F3837">
<INPUT TYPE="hidden" NAME="wf-fmig-key" VALUE="webfmagent">
</FORM>
</HTML>
```

FIG. 19

COMPUTER APPARATUS AND METHOD FOR COMMUNICATING BETWEEN SOFTWARE APPLICATIONS AND COMPUTERS ON THE WORLD-WIDE WEB

RELATED APPLICATION

This application is related to the following U.S. patent applications: "Computer Apparatus and Method for Communicating Between Software Applications and Computers on the World-Wide Web Using Universal Variable Handling", Ser. No. 08/780,014, filed Dec. 23, 1996; "Computer Apparatus and Method for Providing Security Checking for Software Applications Accessed Via the World-Wide Web". U.S. Pat. No. 5,872,915; "Computer Apparatus and Method Including a Disconnect Mechanism for Communicating Between Software Applications and Computers on the World-wide Web". Ser. No. 08/772,738, filed Dec. 23, 1996; and "Computer Apparatus and Method for Providing a Common User Interface for Software Applications Accessed via the World-Wide Web". U.S. Pat. No. 5,892,905.

BACKGROUND OF THE INVENTION

1. Technical Field

This invention generally relates to interactions on the world-wide web, and more specifically relates to an apparatus and method that allows a web user to interact with a software application on another computer system that is accessible via the world-wide web.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

One significant computer network that has recently become very popular is the Internet. The Internet grew out of the modern proliferation of computers and networks, and has evolved into a sophisticated worldwide network of computer systems linked together by web pages that collectively make up the "world-wide web", or WWW. A user at an individual PC (i.e., workstation) that wishes to access the WWW typically does so using a software application known as a web browser. A web browser makes a connection via the WWW to other computers known as web servers, and receives information from the web servers that is displayed on the user's workstation. Information displayed to the user is typically organized into pages that are constructed using a specialized language called Hypertext Markup Language (HTML).

With the growing popularity of the Internet and the WWW, businesses have recognized that the Internet provides a new way to boost both sales and efficiency. If a user with a web browser can interact directly with a company's application software, the transaction will be simplified. For example, let's evaluate how a person typically reserves a rental car. The person calls the rental car agency, and then gives his or her information (i.e., name, address, credit card number, etc.) to the rental car agent over the phone. The agent must enter the information into the company's application software to initialize a process to reserve a car. A more efficient car reservation system for web users would allow the user to interact directly with the application software. This would eliminate many of the tasks that the agent now must perform. However, allowing a software application to interact directly with web users would require creating custom interface software for each specific software application that is to be accessed via the WWW.

In addition, the programming interface and transaction support requirements for accessing software over the WWW can be formidable. Web browsers and web servers have very detailed interface requirements and most complex software applications have native interfaces with very specific and unique protocols for conducting transactions. In addition, successfully conducting transactions over the WWW requires fairly extensive knowledge of Common Gateway Interfaces (CGIs). CGIs are executable programs that are well known to those skilled in the art. Different CGIs with different access procedures are typically provided for each different software application and the native interface for the software application. Achieving successful results requires sophisticated programming know-how and expertise. Many organizations that want access to software over the WWW will typically hire full-time software consultants and professional programmers to design and program the necessary processes for accomplishing the specific functions and WWW transactions desired on a case-by-case basis. Unfortunately, this is a very expensive undertaking. There is, at present, no easy to use and easy to implement solution available for providing WWW transaction support, particularly for more complex software applications.

As the availability of complex software applications over the WWW has increased, the complexity of the transactions being conducted over the WWW has also increased. Further, as a single user accesses multiple applications over the WWW, there must be some mechanism in place to track the inflow and outflow of information between the web browser and the various software applications. In addition, as the scenario is expanded to include multiple users each accessing multiple software applications, the amount of program and transaction support that must be provided becomes increasingly formidable. Each software vendor currently handles these transactions by various different, and sometimes conflicting means.

Finally, as the number of web users, providers, and web servers continues to rapidly expand, it will become increasingly important for a web user to be able to interact directly and efficiently with multiple software applications supported by different vendors. Without a mechanism that is capable of providing improved methods of transaction support between software applications and computers on the world-wide web, the time and effort required to conduct transactions between multiple Internet users and multiple software applications will be excessively long and expensive.

SUMMARY OF THE INVENTION

According to the present invention, a system and method for providing access to software applications from a web browser over the WWW is disclosed. Transaction support procedures for typical application software is provided along with standardized access methods that can be used to support many different hardware and software platforms, thereby providing access to application software over the WWW. The system includes one or more computers executing a web browser, a web server application, an application gateway, and at least one software application.

The present invention allows a user of the web browser to more easily access software applications over the WWW. The user inputs data via the web browser, which is communicated to the web server application. The web server application can serve as an authenticator and authenticates the web browser and passes appropriate input data to an application gateway, including data to uniquely identify and track the user's request. The application gateway then performs the function requested in the web server input data by formatting the appropriate commands with the software application, communicating with the software application using the native interface for the software application. The software application responds by outputting data to the application gateway that includes an identifier that the application gateway uses to match the output data with the web browser that requested the output data. This system thus allows numerous web browsers access to the software application simultaneously.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 8 is an example of HTML code used to generate a car rental reservation form in accordance with a preferred embodiment of the present invention.

FIG. 9 is an example of a data stream generated by a user request from a web browser in accordance with a preferred embodiment of the present invention.

FIG. 10 is an example of HTML code used to generate a reservation confirmation template in accordance with a preferred embodiment of the present invention.

FIG. 11 is an example of the HTML code of FIG. 10 after processing by a CGI in accordance with a preferred embodiment of the present invention.

FIG. 12 is an example of web browser formatted data in accordance with a preferred embodiment of the present invention.

FIG. 13 is an example of HTML code used to generate a web page for a car rental reservation agent in accordance with a preferred embodiment of the present invention.

FIG. 14 is an example of web server generated data in accordance with a preferred embodiment of the present invention.

FIGS. 15a and 15b are an example of HTML code used to generate a car rental agent work list in accordance with a preferred embodiment of the present invention.

FIGS. 16a, 16b, and 16c are an example of HTML code of FIGS. 15a and 15b after processing by a CGI in accordance with a preferred embodiment of the present invention.

FIG. 17 is an example of the data stream received from a web browser by a CGI in accordance with a preferred embodiment of the present invention.

FIG. 18 is an example of HTML code used to generate an automobile availability page in accordance with a preferred embodiment of the present invention.

FIG. 19 is an example of HTML code of FIG. 18 after processing by a CGI in accordance with a preferred embodiment of the present invention.

BEST MODE FOR CARRYING OUT THE INVENTION

The present invention relates to transactions via the WWW. For those individuals who are not Internet or WWW experts, the Overview section below presents many of the concepts that will help to understand the invention.

OVERVIEW

Web Transactions

Figure 2:
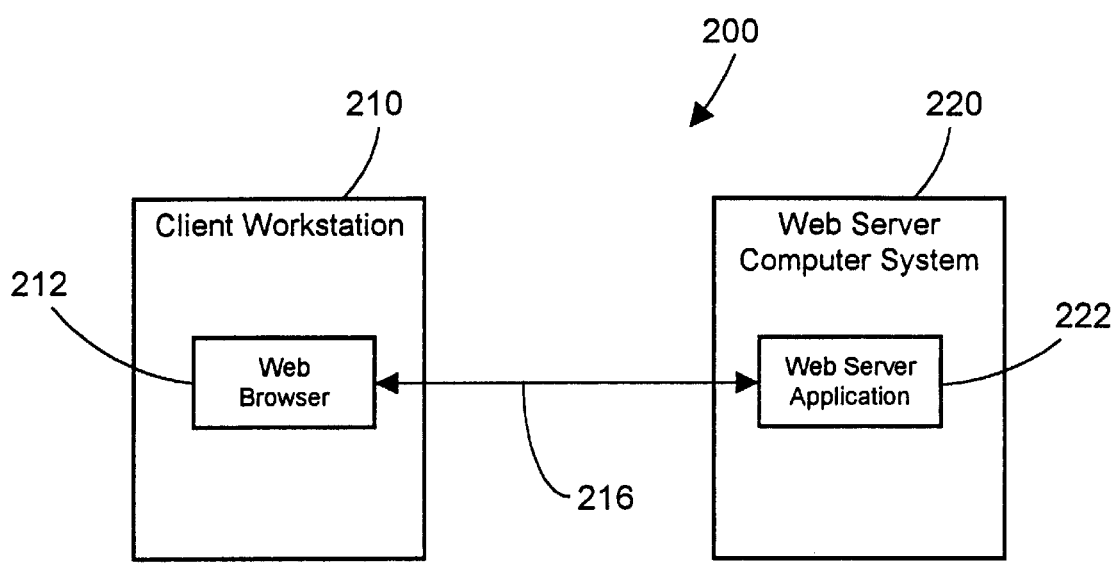
FIG. 2 is a block diagram of a transaction between a client workstation and a web server.

Referring to FIG. 2, a typical transaction between a standard web browser 212 running on a client workstation 210 and a web server application 222 running on a web server computer system 220 occurs over a connection (communication link or communication mechanism) 216. Of course, client workstation 210 may be coupled to other computer systems via a local area network (LAN) or via any other type of computer network or other interconnection.

Likewise, web server computer system 220 may be coupled to other computer systems as well. Client workstation 210 may be any computer that is capable of providing access to the WWW by using web browser 212. This would include handheld, portable or laptop computers, standard desktop computer systems, dumb terminals connected to a mainframe, etc.

Web browser 212 is a software program running on client workstation 210 that allows a user at client workstation 210 to communicate with other computers over connection 216. Web browser 212 would include any web browser which is capable of transmitting and receiving data over the WWW. This includes commercial software applications such as IBM's WebExplorer, Internet Netscape Navigator, Microsoft Explorer, Apple Computer's CyberDog, and any other software application which now exists or which may be developed in the future for accessing or processing information over the WWW. The preferred embodiment for connection 216 is any suitable communication link or communication mechanism to the Internet, including a hard-wired connection, telephone access via a modem or high-speed T1 line, infrared or other wireless communications, computer network communications (whether over a wire or wireless), or any other suitable connection between computers, whether currently known or developed in the future.

It should be noted that client workstation 210 and web server computer system 220 may be the same physical and/or logical computer system. Web browser 212 typically displays pages of HTML data to a user at client workstation 210. Other types of data (besides HTML) may also be transmitted to web browser 212, including text data, graphical data (e.g., Graphic Image Format (GIF) files), audio data or sound files (e.g., WAV files), Java applets (executable code) and a specialized data form known as Multipurpose Internet Mail Extensions (MIME) data (which may include combinations of the foregoing and other data types).

Web server application 222 is a software program running on web server computer system 220 that allows a user at client workstation 210 to access information controlled by web server 220. One preferred embodiment of web server application 222 in accordance with the present invention is a commercial web server application such as IBM's Internet Connection Server. Other applications are also compatible with the present invention. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g, an HTML page) from parts that it retrieves from memory within web server computer system 220 or from other computer systems, or may simply pass through a page that has been constructed at an earlier time or by another computer.

Web browser 212 typically interacts with web server application 222 by transmitting input (e.g., a Uniform Resource Locator (URL) or an HTML page) over connection 216 to web server computer system 220. This input is typically transmitted using HyperText Transfer Protocol (HTTP) 1.0. Web server computer system 220 running web server application 222 receives the input from web browser 212, and in response, outputs data (e.g., an HTML page) to browser 212. Web server computer system 220 may also have numerous other software components, including Common Gateway Interface (CGI) programs or modules, for performing desired functions. The process described above illustrates a basic transaction over the Internet, recognizing that many details and variations that are within the scope of the present invention are not disclosed herein for the purpose of providing a simple context for understanding the concepts of the present invention.

Web Pages

A web page is primarily visual data that is intended to be displayed on the monitor of client workstation 210. Web pages are generally written in Hypertext Markup Language (HTML). When web server application 222 running on web server computer system 220 receives a web page request, it will build a web page in HTML or retrieve a file containing a pre-built web page and send it off across connection 216 to the requesting web browser 212. Web browser 212 understands HTML and interprets it and outputs the web page to the monitor of client workstation 210. This web page displayed on the user's screen may contain text, graphics, and links (which are URL addresses of other web pages.) These other web pages (i.e., those represented by links) may be on the same or on different web servers. The user can retrieve these other web pages by clicking on these links using a mouse or other pointing device. This entire system of web pages with links to other web pages on other servers across the world collectively comprise the "World-Wide Web" (WWW).

The remainder of this specification discloses how to use the invention to enable communication between a web user at client workstation 210 and a software application via the WWW, particularly in the context of work flow software.

DETAILED DESCRIPTION

Figure 1:
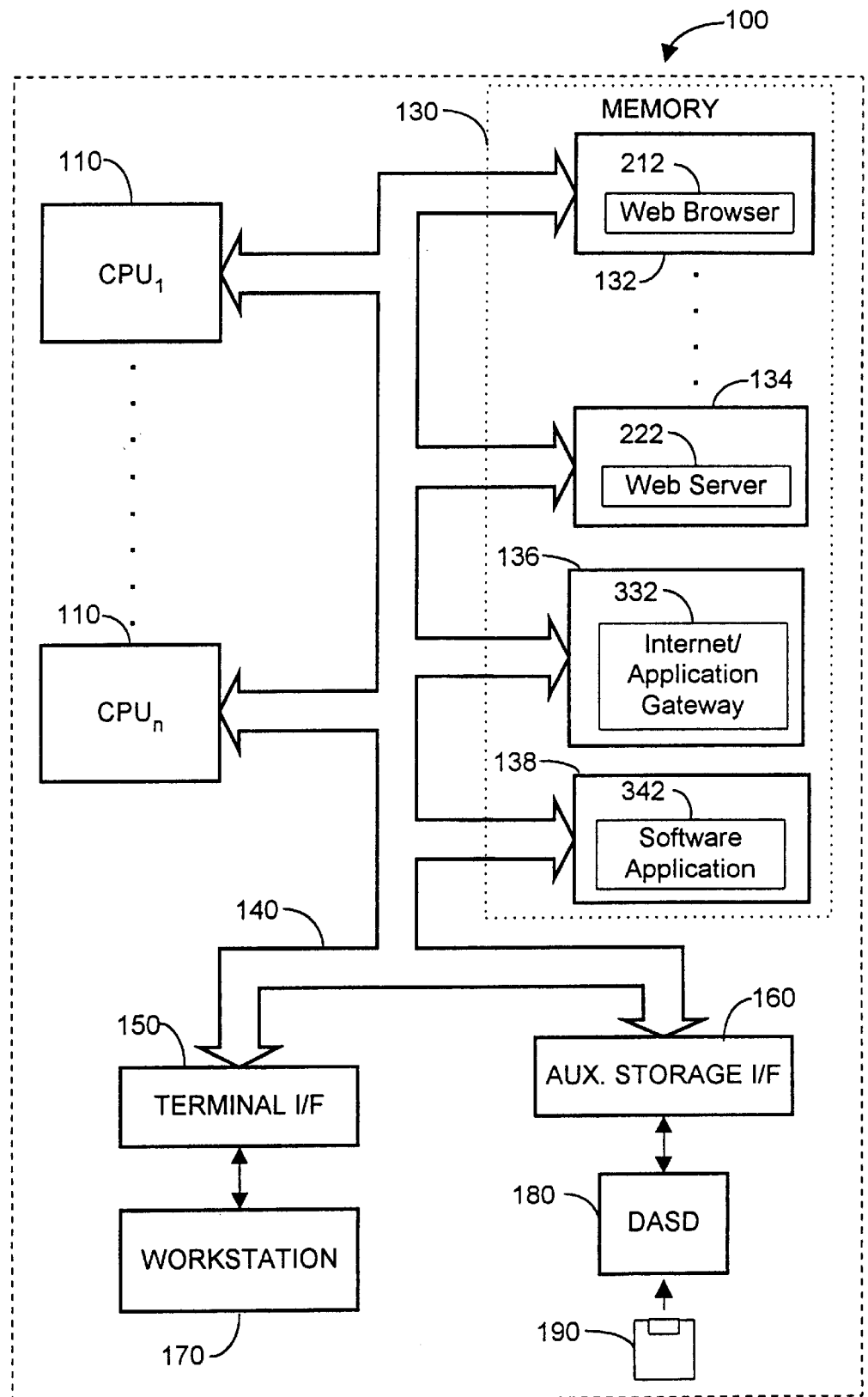
FIG. 1 is a block diagram of a preferred embodiment of the present invention.

Referring now to FIG. 1, a computer system in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a floppy disk 190; a bus 140; and a memory 130 which includes multiple locations for containing various software programs. In this example, memory 130 includes a web browser 212 running in location 132, a web server application 222 running in location 134, an Internet/application gateway program 332 running in location 136, and a software application 342 running in location 138.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, web browser 212 running in location 132 may be part of system 100's cache memory. In addition, memory 130 and CPUs 110 may be distributed across several different computer that collectively comprise system 100. For example, web browser 212 may reside on one computer with CPU, web server application 222 may reside on another computer system with a separate $CPU_2$, Internet/application gateway 332 may reside on a third computer system with a different $CPU_{n-1}$, and software application 342 may reside on a fourth computer with a different $CPU_n$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through programmable workstation 170. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. As shown in FIG. 1, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art.

Figure 3:
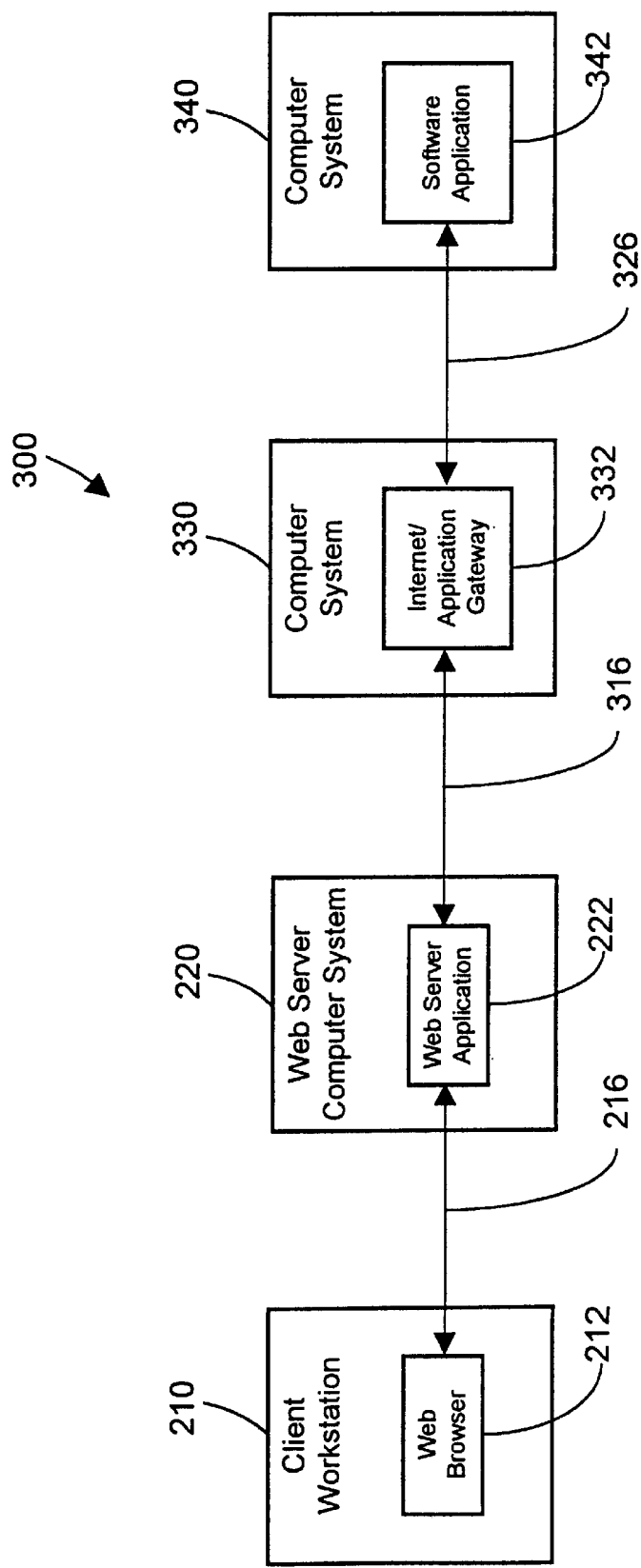
FIG. 3 is a block diagram of a system according to a preferred embodiment of the present invention that allows access to a software application over the World-Wide Web from a standard web browser.

Referring now to FIG. 3, a system 300 for accessing software application 342 via the WWW includes: web browser 212 running on client workstation 210; web server application 222 running on web server computer system 220; connection 216 connecting web browser 212 and web server application 222; an Internet/application gateway 332 running on a computer system 330, a connection 316 connecting web server application 222 and Internet/application gateway 332; a software application 342 running on a computer system 340; and a connection 326 connecting Internet/application gateway 332 and software application 342.

When a user wishes to access software application 342 or retrieve data under the control of software application 342, the user inputs a request from user workstation 210 by providing input to web browser 212. Web browser 212 communicates via connection 216 with web server application 222 which is running on web server computer system 220. Web server computer system 220 and client workstation 210 may or may not be co-located on the same physical computer hardware system. It should be noted that Web Server Application 222 may be co-located with Web Browser 212. In addition, while not required, Computer System 330 and Computer System 340 may be the same computer system. Finally, connections 216, 316, and 326 are communication links or communication mechanisms and may be any type of physical or logical means of connecting computer systems known in the art. This includes, but is not limited to, direct connections, Internet connection, Intranet connections, Infra Red (IR) and other forms of wireless connections. It is anticipated that many alternative methods and material for connecting computer systems will be readily adapted for use with the present invention. This would include those methods and materials to be developed in the future. Web server application 222 will process the request from web browser 212 and, by examining the data stream received from web browser 212, recognize that the user needs to access software application 342. Web server application 222 will then communicate with Internet/application gateway 332 which resides on computer system 330 by using communication link 316. For the discussion herein, data flowing from web browser 212 to software application 342 is considered input data, while data flowing from software application 342 to web browser 212 is considered output data. Thus, data that web browser 212 outputs to web server application 222 is web browser input data (i.e., input data from web browser 212), even though web browser 212 is outputting this data to web server application 222.

Internet/application gateway 332 acts as a translator/facilitator to allow the request from the user to be processed by software application 342. Typically, this will involve translating URLs, HTML codes, or other user-driven commands into a format or language that can be understood and processed by software application 342. This means that Internet/application gateway 332 is capable of communicating with software application 342 using the native interface of software application 342. The user may access Internet/application gateway 332 via a transparent web client interface. This means that the HTML interface is coded so that the user is unaware that they are interacting with software application 342 through Internet/application gateway 332. The interface of web browser 212 need not disclose the source of the data that is being displayed on client workstation 210. The actual processing and communicating being done by Internet/application gateway 332 may be completely hidden from the user of web browser 212. A transparent user interface can thus be implemented by embedding codes and instructions on the appropriate HTML web pages that appear on client workstation 210.

Alternatively, a non-transparent web client interface to Internet/Application Gateway 332 may provided for certain users. These users would be aware that their request is being handled by a different or remote system over the WWW. This may be the case for an in-house software user who has access to a software application that is running on a remote system. the decision as to whether the web client interface is to be transparent or non-transparent can be made at the time the system is developed.

After software application 342 has performed the task requested by the user via web browser 212, the appropriate status or data corresponding to the request is returned to Internet/application gateway 332 via connection 326. Internet/application gateway 332 in turn translates the requested data or status into a form that web server application 222 can understand and transmits the requested data or status to web server application 222 using connection 316. Upon receipt, web server application 222 outputs the requested status or data into a form appropriate for web browser 212. Web browser 212 can then display the appropriate output for client workstation 210. This format would include, once again, any type of data that web browser 212 is capable of understanding (i.e., MIME, JAVA, HTML, etc.).

Figure 5:
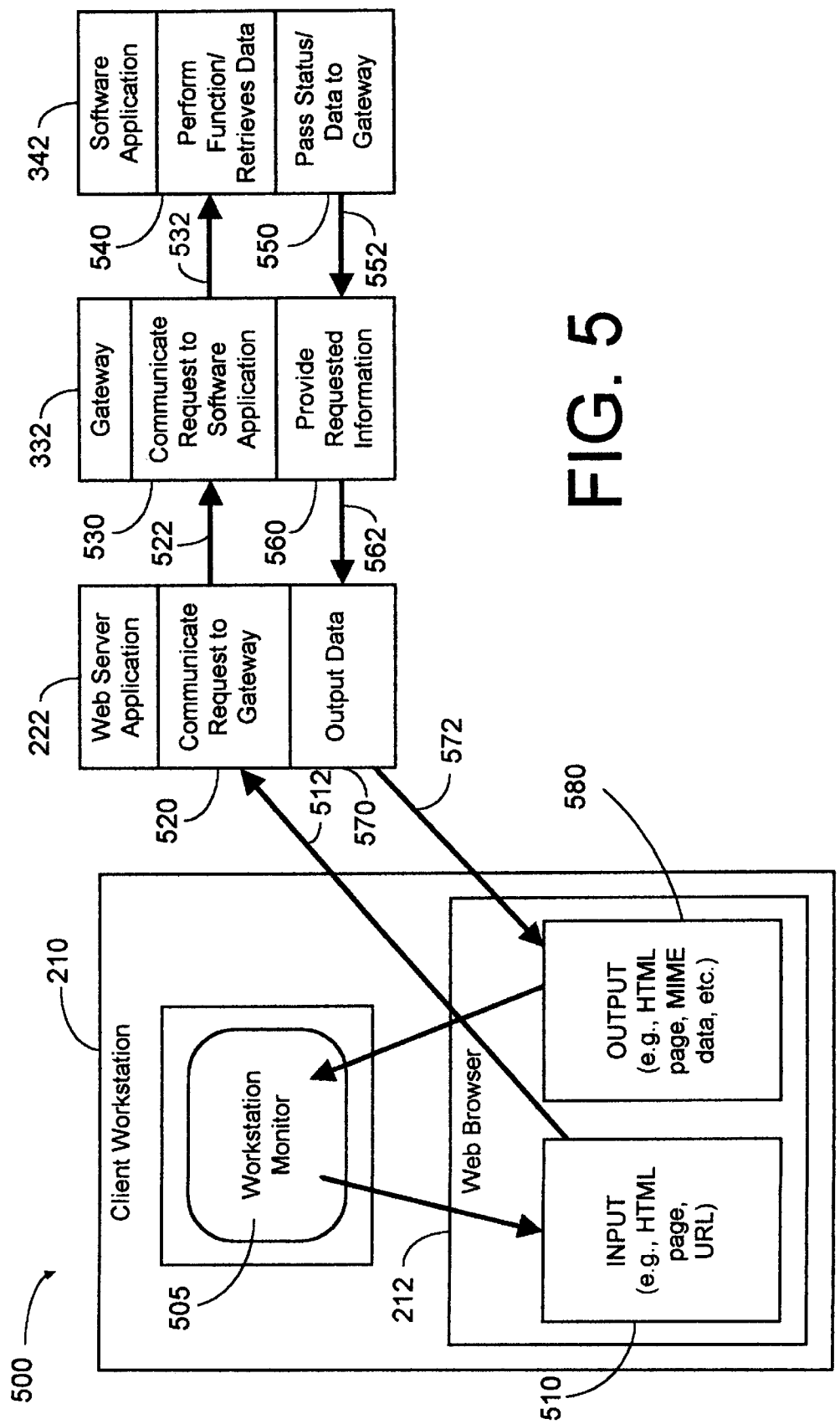
FIG. 5 is a process flow diagram of a preferred embodiment of the present invention that allows access to a software application over the World-Wide Web from a web browser.

Referring now to FIG. 5, a general method 500 of a preferred embodiment of the present invention to access software applications via the WWW may be described in conjunction with the system of FIG. 3. A user at client workstation 210 performs an action that causes web browser 212 to request access to a software application via the WWW by inputting data 510 to web server application 222. Any input data (e.g., input data 510) is referred to herein as web browser input data 512, and may take the form of an HTML page, a URL, etc. Web browser 212 then uses standard communication protocols to pass web browser input data 512 to web server application 222 for processing. Web server application 222 processes the request and recognizes that the user has requested access to software application 342. Web server application 222 then requests authentication data (such as a userID and password) from web browser 212, and authenticates the user if valid authentication data is entered. Once the user has been authenticated, web server application 222 communicates the request to the Gateway 332 (step 520) over connection 522. Any communication 522 from web server application 222 to gateway 332 is referred to herein as web server input ata. Gateway 332 generates from the web server input data appropriate commands that the software application can understand and communicates the commands to software application 342 (step 530), along with sufficient information to identify the process or function that software application 342 will perform to the web client that requested the process or function. Any communication from gateway 332 to software application 342 is referred to herein as software application input data 532. Software application 342 then processes the request on software application input data 532 and performs the necessary function(s) (step 540), and returns the requested status or data to gateway 332 (step 550). Any communication from software application 342 to gateway 332 is referred to herein as software application output data 552. Gateway 332 then determines from information passed with the software application output data 552 which web client corresponds to the software application output data 552. Gateway 332 then determines how to act upon the software application output data, and generally provides status or data to web server application 222 (step 560). Any communication from gateway 332 to web server application 222 (e.g., over connection 562) is referred to herein as web server output data 562. Web server application 222 then provides the web server output data 562 (e.g., output data 580) to web browser 212 (step 570). Any communication between web server application 222 and web browser 212 is referred to herein as web browser output data 572. Finally, web browser 212 provides web browser output data 572 (e.g., output data 580) to the user in the appropriate form (e.g., displays an HTML page on workstation monitor 505).

Note that the connections shown in FIG. 5 are representative of different types of data flow, and do not necessarily represent any specific physical connections. For example, web browser input data 512 and web browser output data 572 of FIG. 5 are both communicated via connection 216 of FIG. 3. Web server input data 522 and web server output data 562 are both communicated via connection 316 of FIG. 3. Software application input data 532 and software application output data 552 are both communicated via connection 326 of FIG. 3.

FIG. 5 depicts a preferred embodiment of a method in accordance with the present invention and describes the interaction and communication between a single web browser and a software application. However, the present invention is not limited to an environment with a single user and a single web browser. As explained below with regard to FIG. 7, a multi-user system is contemplated where multiple users will use multiple web browsers to simultaneously access the same software application via the WWW. The Internet/application gateway 332 provides a mechanism to track interactions between multiple users and match the requests made to the software application by each user for the various desired transactions.

Figure 4:
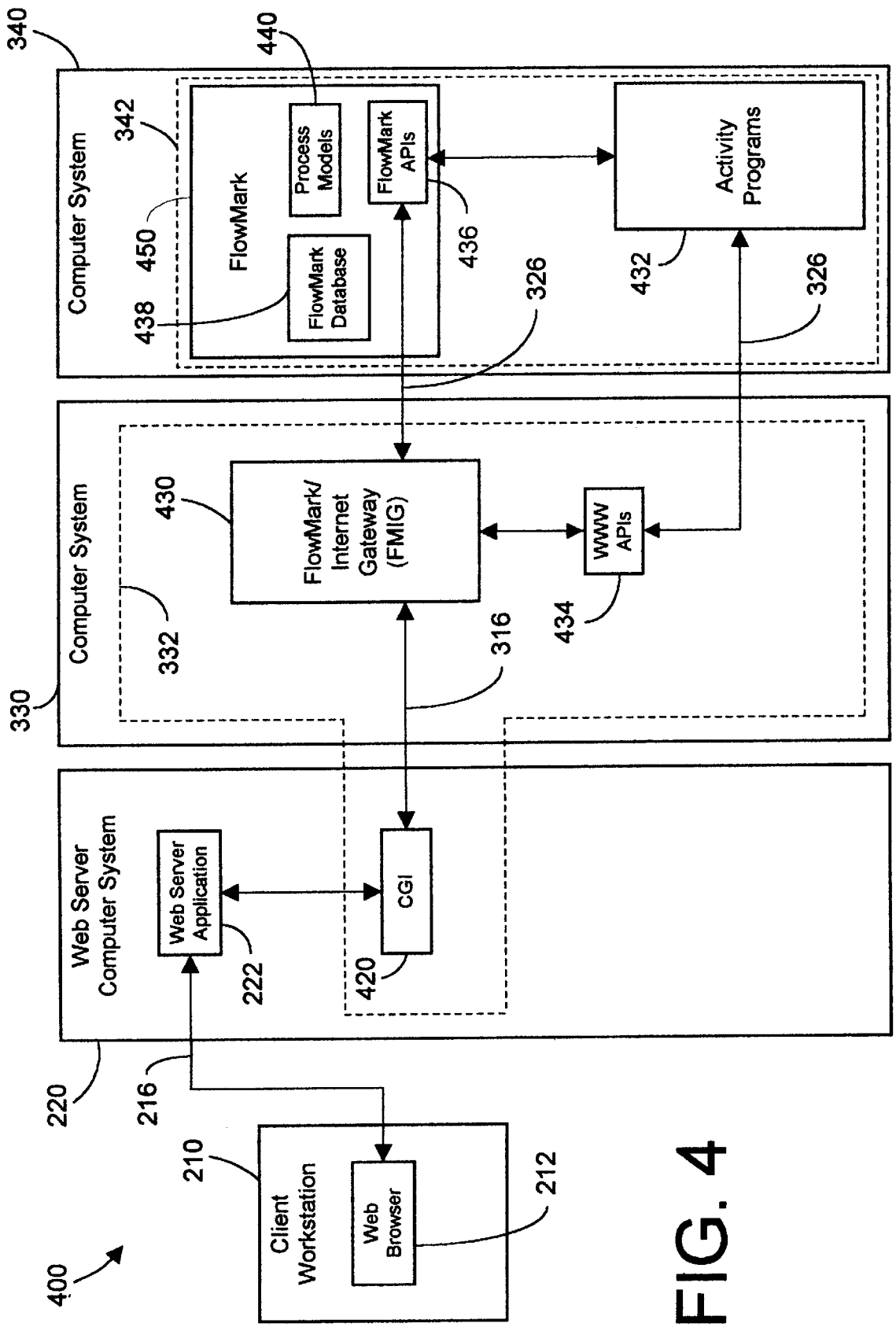
FIG. 4 is a more detailed block diagram of the system of FIG. 3, further adapted to access FlowMark workflow application software over the World-Wide Web.

Referring now to FIG. 4, a system 400 allows accessing a FlowMark workflow system over the WWW from web browser 212. In this example, software application 342 is a work flow application known as FlowMark which is programmed to perform a specific function. While this specific example uses FlowMark to describe the invention, the present invention is not limited to FlowMark. Other software applications may be used in conjunction with the present invention and it is anticipated that additional application software packages will be so used.

FlowMark is a popular process engineering tool that allows a relatively complex project or task to be broken down into a series of smaller processes or tasks. The activity to be executed by FlowMark is described by using one or more process models 440 that describe the process flow and activity. This makes FlowMark very useful for activities and transactions that can be accomplished by computer systems over communication networks. FlowMark is used to build process models 440 which describe the real life task as a series of computerized sequences. Information is processed by the FlowMark workflow software and usually involves multiple related activities. The FlowMark workflow process language models the activity and automates transactions where appropriate. Individual tasks are generated into "work lists" (i.e., electronic "to do" lists). One example of using FlowMark to accomplish a specific task will be presented in detail below.

System 400 of FIG. 4 represents one suitable detailed implementation of system 300 shown in FIG. 3. The same computer systems are present (i.e., 210, 220, 330, and 340), with web browser 212 and web server application 222 residing on client workstation 210 and web server computer system 220, respectively. In addition, connection 326 of FIG. 3 encompasses two connections 326 of FIG. 4. System 400 of FIG. 4 is presented herein to show one specific implementation of Internet/application gateway 332 when used to communicate with FlowMark workflow software application 342.

For this specific implementation, Internet/application gateway 332 includes a Common Gateway Interface (CGI) 420, a FlowMark/Internet Gateway (FMIG) 430 and WWW Application Program Interfaces (APIs) 434. The four standard WWW APIs are Open, Close, Send, and Receive. WWW APIs 434 provide a communication link between FMIG 430 and activity program 432. FlowMark application software 342 includes FlowMark 450, and one or more activity programs 432. FlowMark 450 includes a database 438, one or more process models 440, and FlowMark APIs 436. A specific software application 342 is implemented in system 400 by defining a process model 440 within FlowMark, and by defining activity programs 432 that perform specific tasks within process model 440. FlowMark Application Program Interfaces (APIs) 436 are standard APIs that are supplied with FlowMark 450 and provide a way for activity programs 432 and FMIG 430 to communicate with FlowMark 450. FlowMark database 438 is a general purpose database that may be used to store information relating to any process model. For example, if a process model 440 and activity programs 432 implement a rental car work flow process, FlowMark database 438 would be used to store information relating to the rental car process, such as which cars are available, etc.

The user who needs to access a FlowMark application 342 over the WWW will input a request to web browser 212 using client workstation 210. The user can enter a URL for a specific home page site or click on a button presented in an HTML-generated user interface using web browser 212. When the user "submits" the requested information, usually by clicking on a button presented on an HTML form, web server application 222 receives input data from web browser 212. This data stream may be presented to web server application 222 in many different formats, including RFC 1866 or RFC 1867 formats. These two specific formats are just examples of common data stream formats that common web browsers understand. The present invention is not limited to these formats but includes any data transmission format now known or developed in the future.

If the user-requested information requires access to FlowMark application 342, there will be a command embedded in the data stream that identifies the need to access CGI 420 which will, in turn, provide access to FlowMark application 342. For this specific example, the command is a call to CGI 420. The call to CGI 420 may be part of the URL or, alternatively, may be embedded in the data submitted by web browser 212. Access to CGI 420 is protected to keep unauthorized users from accessing FlowMark application 342 via the WWW. In order to gain access to CGI 420, the user must be authenticated by web server application 222. When web server application 222 sees the CGI command in the data stream generated by web browser 212, it requests a password and user identification (userID) from the user via web browser application 222. After the user has been authenticated, web browser application 222 passes control to CGI 420 to perform the needed operation(s).

CGIs are executable programs that are well known to those skilled in the art. CGIs function to provide a mechanism for transmitting information across the WWW. CGI 420 passes information from web server application 222 to FMIG 430 in the form of commands. The commands are one-way, i.e., from CGI 420 to FMIG 430, but data and status pass in both directions. Web server application 222 invokes CGI 420, and sends the appropriate commands and data regarding the request. Although the current preferred embodiment of the invention uses the "CGI Post" (stdin) format for data transmission from web browser 212 to CGI 420, any other data transmission formats that may be generated by web browser 212 are contemplated and are within the scope of this invention. In addition, it should be noted that the parsing and other operational functions of CGI 420 may be implemented in other ways. For example, many web server applications currently support "modules." Modules are software routines implemented by using Dynamic Linked Libraries (DLLs). Modules are capable of performing the same functions as CGI 420 in system 400 of FIG. 4 and may replace CGI 420 in some preferred embodiments of the present invention. The use of modules and DLLs is well known to those skilled in the art. Therefore, the use of CGI 420 is for purposes of illustration only and is not a limitation of the present invention.

After receiving the data from web browser 212, CGI 420 parses the data to locate relevant information about the requested processes, including the request for access to FlowMark 342. CGI 420 sends the user data and requests to FMIG 430 along with some control information. FMIG 430 provides a way for FlowMark application 342 to interact with a web user over the WWW. FMIG 430 directs the flow of information between CGI 420 and FlowMark application 342 and initiates FlowMark functions by using FlowMark APIs 436. For example, FMIG 430 may invoke a FlowMark API 436 to create a process instance necessary to process the request submitted by the user. Then, using a different FlowMark API 436, FMIG 430 can invoke or start this process instance. The process is governed by a process model 440, which tells FlowMark 450 which activity program 432 must be invoked to perform the desired task. Once FMIG 430 has started a FlowMark process, it waits until it receives information from FlowMark 450 via FlowMark APIs 436 or from activity programs 432 via WWW APIs 434 that the request has been processed. The command interface between FMIG 430 and FlowMark APIs 436 is one-way, i.e., FMIG 430 always invokes FlowMark APIs 436, but the data and status information flows in both directions. This is important because it allows the interface to FlowMark application 342 to remain unchanged even if the web interface is changed.

FMIG 430 will also act as an identifier mechanism and assign a "conversation identifier" to the requests from each web client that require interaction with FlowMark. This identifier uniquely marks or tags all conversations between a specific web browser and FlowMark. A conversation is generally commenced by invoking an OPEN application program interface (API), and is generally closed by invoking a CLOSE API. FMIG 430 uses the conversation identifier to keep track of individual requests because FMIG 430 may be working with multiple users and multiple requests from each of those users. FMIG 430 thus maintains the information necessary to control the flow of information between the various users and the process instances being processed by FlowMark.

Activity programs 432 are software modules which can be used by FlowMark to accomplish the tasks requested by the user. Individual activity programs 432 are initiated by FlowMark and then the Activity Program 432 communicates with the web client via WWW APIs 434. Each workflow process model 440 initiates the activity programs 432 necessary to accomplish the designated task. Each activity program 432 is an instance of a program that runs to accomplish the desired task, returns the requested information, and then terminates. For example, activity programs 432 may require information from the user in order to process the user's request. Activity program 432 invokes appropriate WWW APIs 434 to obtain the necessary data. In this case, FMIG 430 has data waiting to submit to activity program 432, which is the same data that CGI 420 sent earlier in the process. Activity program 432 invokes WWW API 434 to send a request for the data to FMIG 430 and FMIG 430 returns this data to activity program 432 in response to the request from WWW API 434. Activity program 432 takes the appropriate steps to process the data and fill the request. Activity programs 432 communicate with the user through WWW APIs 434, FMIG 430, CGI 420, web server application 222, and web browser 212. Activity programs 432 will also receive a return code from WWW API 434 to verify that the user has received the requested data. After confirmation has been received, that specific instance of activity programs 432 is finished with that request and will terminate. Other instances of one or more activity programs 432 may still be active, processing other requests.

WWW APIs 434 serve to provide interaction between FMIG 430 and activity programs 432. WWW APIs 434 allow FlowMark activity programs 432 to send and receive data and status to and from web clients. It is important to note the FlowMark APIs 436 remain unchanged. This is important because FlowMark APIs are not modified to allow a web user to access FlowMark. In this sense, FlowMark is unaware that a web client is accessing it, and FlowMark operates in the same manner it would as if a dedicated application were performing the requested functions. Since the FlowMark APIs are not affected, the operation of FlowMark will remain stable regardless of the process or task the web client is requesting that FlowMark application 342 accomplish. Multiple users from multiple locations can access FlowMark via the WWW and be assured that the FlowMark interface will remain stable. In some cases, the system will present a transparent web client, which means that there will be no indication to the user that their request is being processed by FlowMark application 342.

It should be noted that Web Server Application 222 may be co-located with Web Browser 212. In addition, while not required, Computer System 330 and Computer System 340 are the same computer system in the preferred embodiment. Finally, connections 216, 316, and 326 may be any type of physical or logical means of connecting computer systems known in the art. This includes, but is not limited to, direct connections, Internet connections, Intranet connections, Infrared (IR) and other forms of wireless connections. It is anticipated that many alternative methods and material for connecting computer systems will be readily adapted for use with the present invention. In sum, while several separate computer systems are disclosed herein (e.g., FIGS. 3 and 4), a computer system in accordance with the present invention may include any number or combination of computer systems. The figures herein are shown to illustrate salient aspects of the invention, and should not be construed to limit the invention to the particular configurations illustrated herein.

Figure 6:
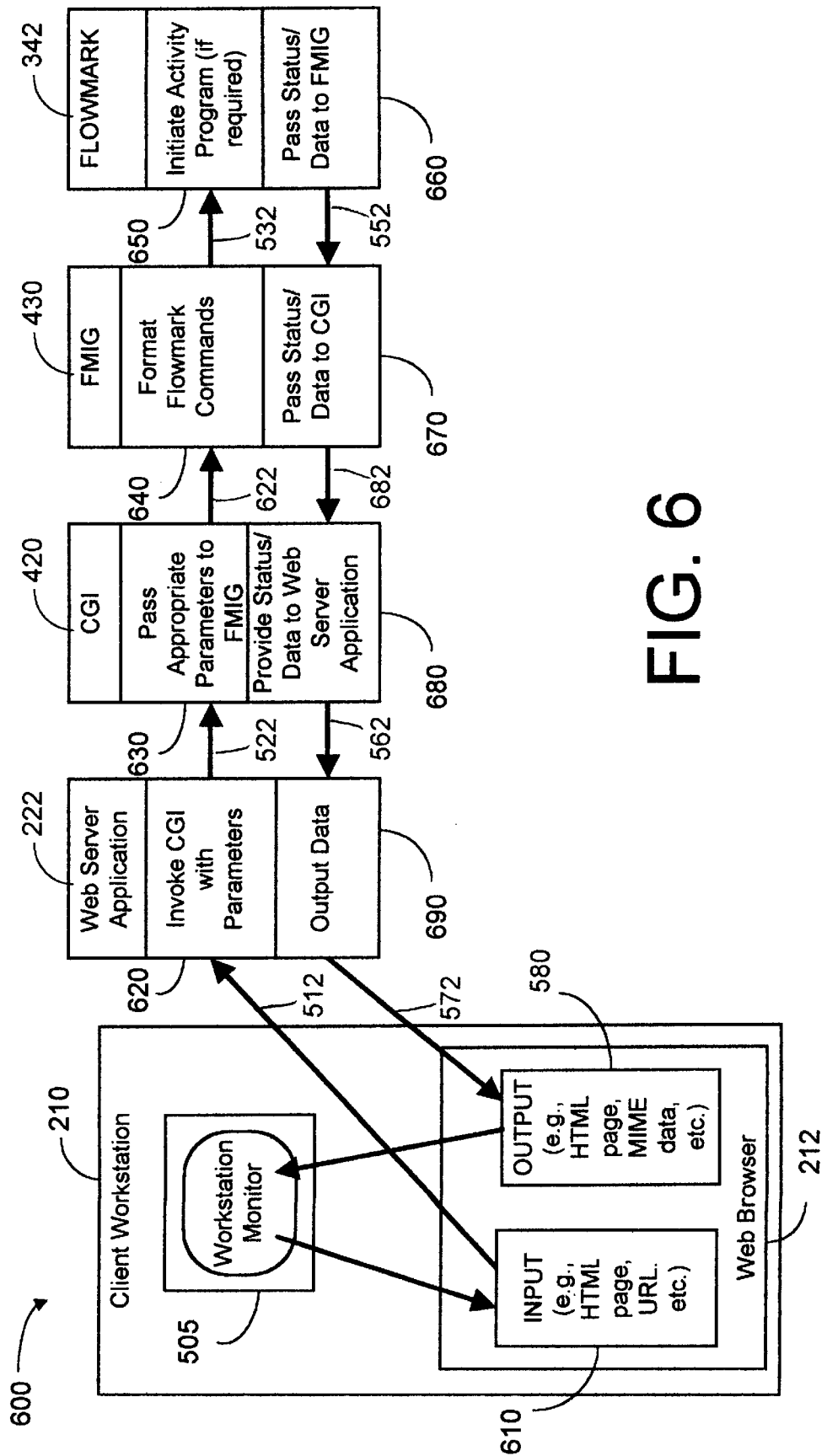
FIG. 6 is a process flow diagram of a preferred embodiment of the present invention adapted for accessing the FlowMark workflow application over the World-Wide Web.

Referring now to FIG. 6, a method 600 in accordance with a preferred embodiment of the present invention allows a user of web browser 212 to access a FlowMark application 342 with the system 400 of FIG. 4. Since the detailed steps of the method were discussed above in describing system 400 (FIG. 4), only an overview of the method steps will be presented here. Please see the description of system 400 of FIG. 4 and the description of the Rental Car Example that follows for the more detailed steps in accordance with the present invention. A user at client workstation 210 takes some action (e.g., submits input data 610) via web browser 212 to initiate an access to FlowMark application 342 via the WWW. This action may involve submitting a URL address, clicking on a button of an HTML page displayed on the workstation, or some other activity. The user request and accompanying data is passed to web server application 222 by web browser 212. Web server application 222 receives the user request and data and passes appropriate parameters to CGI 420 (step 620). The CGI then passes appropriate parameters to the FlowMark/Internet Gateway (FMIG) 430 (step 630). The FMIG formats FlowMark commands as necessary to accomplish the desired user task within FlowMark (step 640). This may included retrieving additional information, calculating requested data, etc. If necessary, FlowMark application 342 will initiate one or more activity programs to accomplish the task or to provide the requested status or data (step 650). In turn, after the activity program has completed the necessary processes, the activity program or programs will pass the response, including any required data, to FMIG 430 (step 660). FMIG 430 then passes the status or data to CGI 420 (step 670), and CGI 420 passes the status or data to web server application 222 (step 680). Web server application 222 outputs the status or data to web browser (step 690). Web browser 212 then provides output data 580 to the user in the appropriate form (e.g., displays an HTML page on workstation monitor 505).

Note that most of the connections shown in FIG. 6 are the same as those shown and discussed with reference to FIG. 5. Like method 500 of FIG. 5, method 600 of FIG. 6 includes various data inputs and outputs (i.e., 512, 522, 532, 552, 562, and 572) that were explained in reference to method 500. In addition, a FMIG data input 622 communicates data from CGI 420 to FMIG 430, and a FMIG data output 682 communicates data from FMIG 430 to CGI 420. Note that CGI input data 522 and CGI output data 562 are shown connected to CGI 420, since CGIs are typically executed on web server computer system 220 in response to web server application 222 invoking them.

Figure 7:
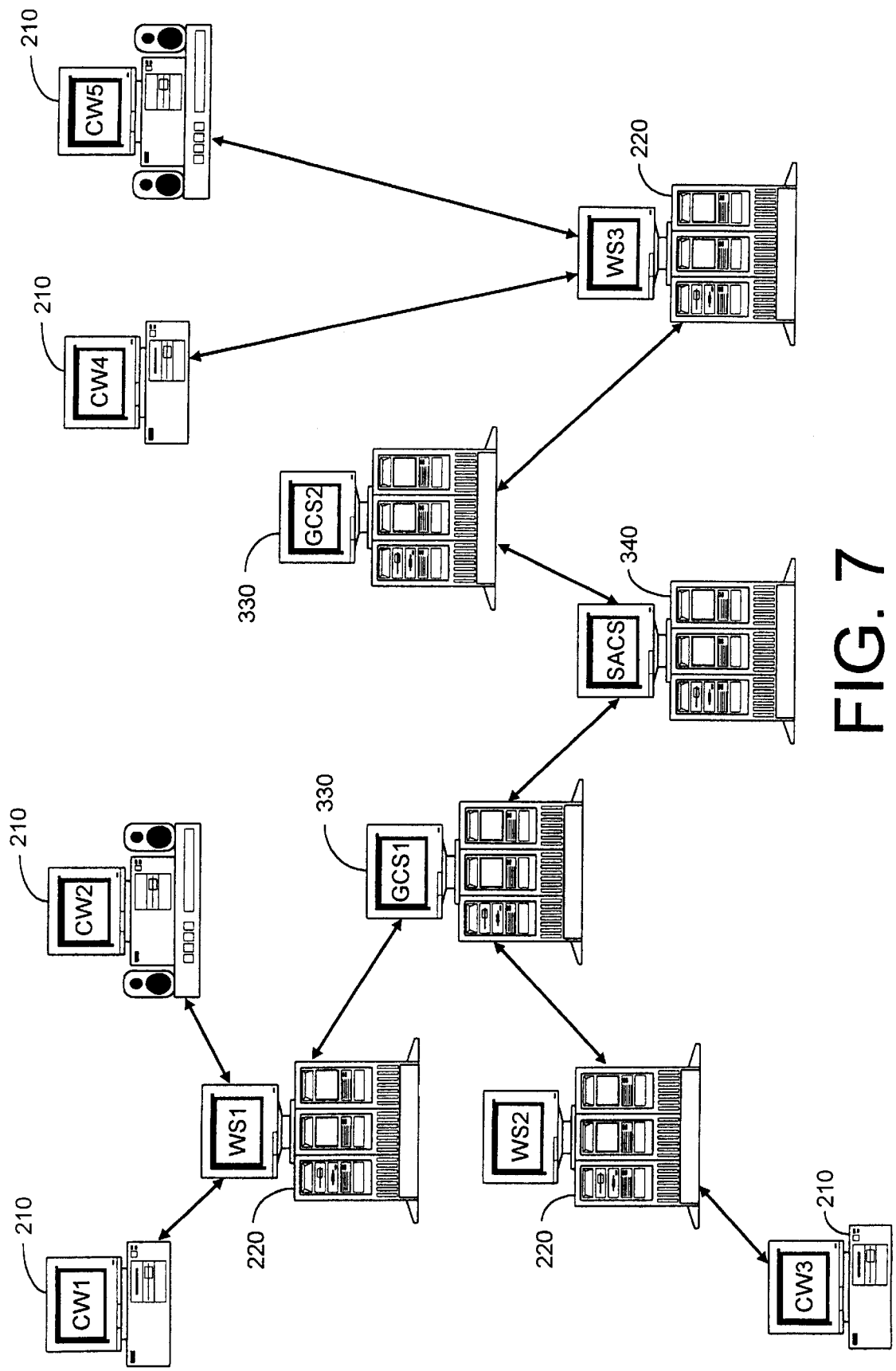
FIG. 7 is a block diagram of a preferred embodiment of the present invention when expanded to a multi-user environment.

Referring now to FIG. 7, advantages of the present invention become most apparent when multiple users are trying to access a single software application simultaneously via web browsers 212 on the WWW. Each web user will generally have a client workstation 210 that will be used to access the WWW. For the specific configuration of FIG. 7, client workstations 1 and 2 (CW1 and CW2) are coupled to web server 1 (WS1), and client workstations 3 is coupled to web server 2 (WS2). Client workstations CW4 and CW5 are coupled to web server 3 (WS3). Both web servers WS1 and WS2 are coupled to a gateway computer system (GCS), in this case, GCS1. As shown, WS3 is coupled to GCS2. GCS1 and GCS2 are both coupled to a software application computer system (SACS) that is running the software application that web users need to access via the WWW.

The present invention manages all the accesses by all these client workstations (CW1–CW5) to application software running on SACS in a manner that assures that the requested functions are performed as requested. The GCS provides the application gateway that directs traffic between the web clients and the software application. By assigning unique identifiers to each conversation, the GCS can interact with the software application running on SACS using its native interface, and can then identify output from the software application and match it with the web client that requested the output. Some of the client workstations may be used to provide customer service via GCS1 in a production environment while GCS2 may be used to perform in-house testing.

Car Rental Example

Figure 20:
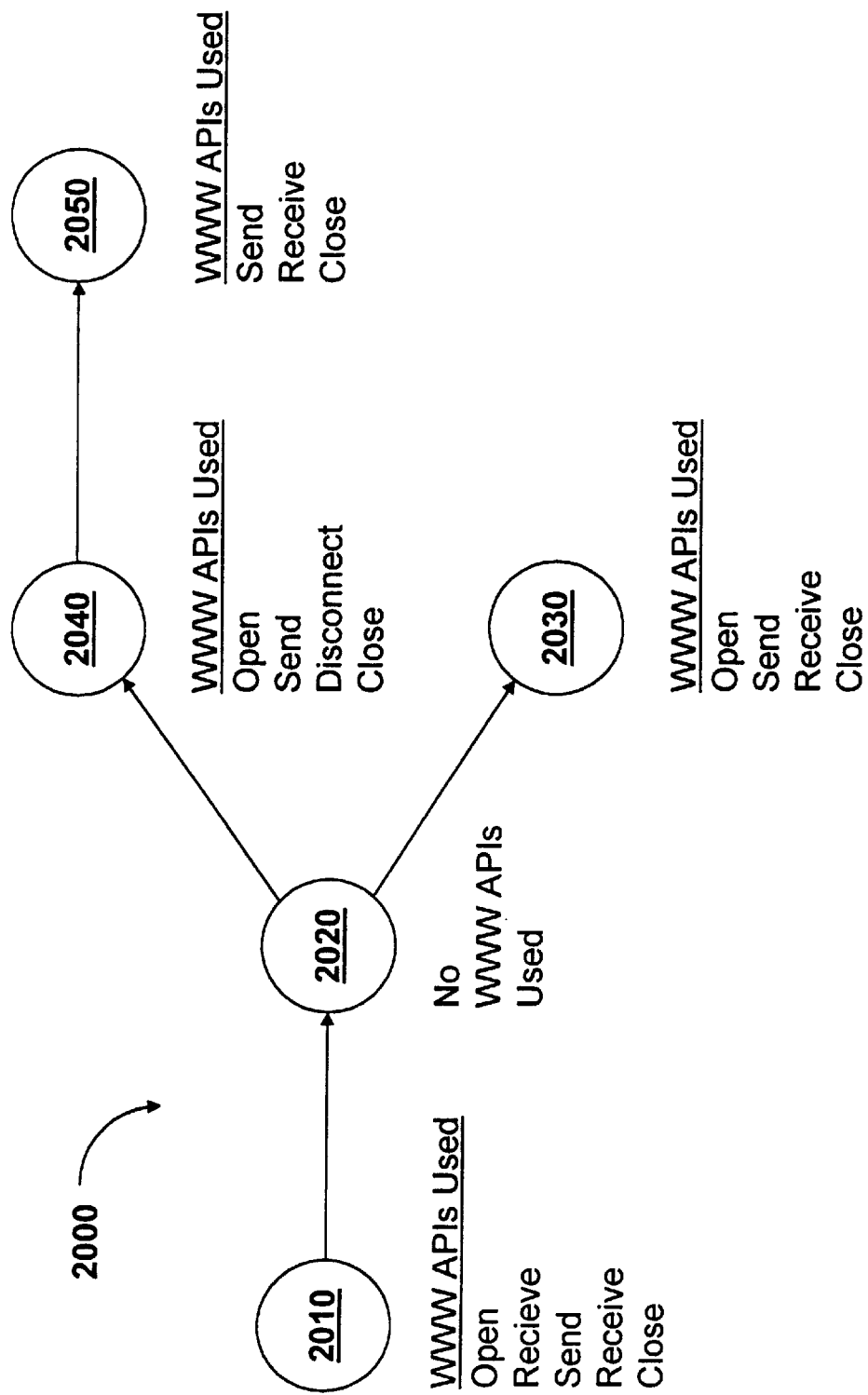
FIG. 20 is a process model diagram that describes a WWW transaction with a software application using a preferred embodiment of the present invention.

A specific example of a preferred embodiment of the present invention can be described in greater detail by using the situation where a person wants to rent a car by accessing FlowMark application software for a rental car agency over the WWW. Referring now to FIG. 20, a process model 2000 for the overall car rental example includes process steps 2010, 2020, 2030, 2040, and 2050. In process step 2010 of process model 2000, an activity program receives car rental information, locates the next reservation number, saves the reservation number to a file, returns the reservation number to the requester and sets the reservation number in the FlowMark output data container. Process step 2010 uses FlowMark Internet Connection WWW APIs and data container APIs. Process step 2020 is an activity program which determines if a car is available to fill the reservation. The subsequent path taken in Process Model 2000 is dependant upon the results of this determination. If a car is available to fill the reservation, then the next step in process model 2000 would be process step 2030. If, however, no car is available to fill the reservation request, the next step in the process model would be process step 2040. In process step 2030, an available car which matches the car rental request is identified and scheduled to fill the reservation request. In addition, the reservation confirmation number is generated and transferred to the requester. In process step 2040, the car rental agent has the option of deciding whether or not to try and find a rental car from another location to fill the reservation request. If the availability of a rental car at an alternative location is sought, then the next step in process model 2000 would be process step 2050. In process step 2050, an activity program is available for scheduling and moving a car from one location to another location to fill the reservation request. Process step 2050 presents a list of cars that are available at alternate locations so that the car rental agent can select an appropriate car to be moved. Each of these steps is described in greater detail below.

Referring now to FIG. 4 and FIG. 20, the person or user who wants to rent a car will access the WWW by using client workstation 210 which is running web browser 212. The user will enter the URL for the rental car agency and locate the home page site for the rental car agency using web browser 212. Then, the user will locate the appropriate area or page on the rental car agency's web site which has been previously set up to accept requests for renting cars. We assume for this example that there is a rental reservation form on the rental car agency's web site. After locating the car rental reservation form, the user will enter the information required by the car rental agency. This information would typically include items such as a customer identification number, password, the city where the car is to be rented, desired dates for renting the rental car, the specific type of car to be rented (i.e., make, model, and size), etc.

One example of the HTML that would generate a suitable rental reservation form is shown in FIG. 8. This form requires a user to input his or her member number, last name, first name, middle initial, origin city, state, start date, number of days, and car preference. Once the user has input this information, the user submits his or her information by clicking on a "submit" button on the rental reservation form. At this point, web server application 222 receives the data stream generated by the user request from web browser 212. One suitable format picks out all variables and other relevant information data and sends it to web server application 222 in a post data stream format, which would look like the data stream of FIG. 9. As explained above, this data stream may be presented to web server application 222 in many different data formats and the present invention is not limited to any specific data format. These activities are encompassed in process step 2010 of FIG. 20.

Web server application 222 examines the data stream from web browser 212 to determine what action should be taken to fulfill the user's request. In this specific example, a call to CGI 420 from the line in the HTML form that reads "<FORM ACTION="/cgi-prot/exmp5cgi.exe" METHOD= "POST">tells web server application 222 that it needs to call the protected CGI called exmp5cgi.exe, which we assume is CGI 420. When web server application 222 sees this call to a protected CGI, it knows that authentication is required before web server application 222 grants access to CGI 420.

Because CGI 420 is protected, access to CGI 420 must be controlled to avoid unauthorized users from accessing Flow-Mark application 342 via the WWW. In response to the parameters in the HTML form that specify CGI 420, web server application 222 must authenticate the web user. This authentication requires the user to enter a userID and password and web server application 222 issues a REALM request to web browser 212. A REALM request is a well-known software security feature which requires the user to input a userID and password in order to gain access to CGI 420. Web browser 212 stores the userID and password received from the user, and sends this information to web server application 222. Web server application 222 uses the userID and password to authenticate the user before granting the user access to CGI 420. It should be noted that some future implementations of web browser 212 will most likely provide a mechanism for web browser 212 to insert some form of the authentication data into the data stream transmitted to web server application 222. All methods and techniques for gathering authentication data and transmitting it from web browser 212 to web server application 222 are within the scope of the present invention.

Once authenticated, web server application 222 passes control to CGI 420, which receives data from web browser 212. For this specific example, CGI 420 receives the data stream in "post" format via a standard input protocol "stdin". The post format is a data format description well known to those skilled in the art. Stdin is a file descriptor that reads post data. Although a current preferred embodiment of the invention uses the post data format description, any other data formats that may be used by web browser 212 and web server application 222 are contemplated and are within the scope of this invention. The post data for the rental reservation form that is transmitted from web browser 212 to CGI 420 for this example is shown in FIG. 9.

Once CGI 420 receives the post data from web browser 212, it parses the data, and looks for workflow variables. In our example, workflow variables have a wf- prefix. The two hidden workflow variables are "wf-cgi-submit=2" and "wfcgi-html=\exm\smp\exmp5srk.html". The first of these, "wf-cgi-submit=2", tells CGI 420 that it needs to create and start a FlowMark process instance. The two non-hidden workflow variables are "wf-fmig-key" and "wf-api-proc-template="WWW.Reservation.Request". These variables indicate which process template should be created and started. CGI 420 then sends the post data and the environment data to FMIG 430 along with other control information. Environment data is available through standard programming techniques which are well known to those skilled in the art and can be passed to CGI 420 as a standard "C" programming language parameter.

FMIG 430 directs the flow of information between CGI 420 and FlowMark application 342 by using FlowMark APIs 436 to communicate requests from CGI 420. These FlowMark APIs are standard APIs that ship with the Flow-Mark product, and need not be changed to accommodate the present invention. This is important because it allows the native command interface to FlowMark application 342 to remain unchanged even though a new web interface is being provided. Note that the command interface between FMIG 430 and FlowMark application 342 is one-way, i.e., FMIG 430 always invokes FlowMark APIs 436, but data and status information flows in both directions.

After receiving the data from CGI 420, FMIG 430 parses the data and locates the userID and key from the wf-fmig-key variable to determine whether there is a corresponding FlowMark userID and other FlowMark access information that provides the user access to FlowMark application 342. Assuming the userID and key has corresponding FlowMark access information, FMIG 430 then logs into FlowMark application 342 using this access information. FMIG 430 invokes one of FlowMark APIs 436 to create a process instance necessary to process the request submitted by the user. In this example, the request would create a process instance called "www_Reservation_Request." This process instance has been specifically designed to handle WWW car rental transactions. Then, using a different FlowMark API 436, FMIG 430 invokes or starts this process instance. FMIG 430 also saves the appropriate HTML variable information for the "wf-cgi-html" variable, which tells FMIG 430 which HTML to render after the workflow sequence has ended. The prefix to the FlowMark process www_Reservation_Request tells FMIG 430 that this process is web-enabled, meaning that an activity program 432 will use WWW APIs 434 to communicate with FMIG 430. To assure that FMIG 430 can match up the process instance with the web browser that requested it, FMIG 430 generates and stores a "handle" for this web client. Depending on the process, the handle is some combination of the process instance name, the activity instance name, and the security data for the web client. This handle is a unique identifier for the web client. FMIG 430 then enters the handle, process instance, userID, etc. into its internal data cache. FMIG 430 then waits for a WWW API 434 to connect. At this point, CGI 420 is still connected to FMIG 430 via connection 316 and is waiting to receive the requested status or data from FMIG 430 to fill the user's car rental request.

When the car rental reservation process model was initially built, the first activity program 432 was identified and designated to run automatically whenever the FlowMark car rental reservation process model was invoked. This means that whenever FMIG 430 creates and starts a FlowMark instance of the car rental reservation process model, the first car rental reservation FlowMark activity program 432 will be automatically started by FlowMark application 432. In this specific example, there will be multiple related activity programs 432 that will work together to process the car rental request. The FlowMark workflow process language models the car rental request and reservation process and automates transactions where appropriate. To process the car rental request, FlowMark application 342 will create an instance of the car rental reservation process model in FlowMark database 438 and then check to see if the Program Execution Client (PEC) is active. The PEC is a supervisory program module that coordinates the operation and flow of activities in FlowMark application 342. Once the PEC is active, FlowMark application 342 dispatches the activity to the PEC, and updates FlowMark database 438 to indicate that the activity is running. Then, the PEC starts the activity program 432 which has been registered to the first activity in the process. The selected activity program 432 then begins to run. The number and nature of activity programs 432 necessary to process the web client's car rental request will depend on how the process model 440 was designed. For example, some process models 440 may model an activity as a completely automatic process which runs to completion without any human intervention. Alternatively, a process model 440 may require extensive human input and intervention before it finishes the model process. Regardless of design, each workflow process model 440 initiates the specific activity program 432 necessary to accomplish the designated task or tasks specified to completed the modeled process or procedure.

Each individual activity program 432 is a separate software module that is designed to accomplish a specific task or return some requested information, and then terminate. WWW APIs 434 allow FlowMark activity programs 432 to send and receive data and status to and from web clients via the WWW. WWW APIs 434 are always invoked by activity program 432, but data and status information flows in both directions between FMIG 430 and activity programs 432.

In order to process the rental car request of this example, multiple related activity programs 432 may be invoked to complete the workflow process specified in process model 440. For example, one activity program may be initiated to query FlowMark database 438 to determine if the person requesting the rental car is an existing customer of the car rental agency. If they are, then the customer identification number will match an existing account number in FlowMark database 438 and activity program 432 can proceed and process the car rental request. If, however, the person requesting the rental car is not an existing customer, a different activity program 432 may be initiated to communicate with the web client, gather the necessary information, and enter the web client's customer information into FlowMark database 438.

Next, once a valid customer identity has been established, another activity program 432 may be initiated which will determine if the request can be filled according to the customer's request. This would be encompassed in process step 2020 of FIG. 20. For example, is a car available on the requested date, in the requested city, in the requested size, etc.? Alternatively, the FlowMark process model may specify that the car rental request should be routed to a human agent for further processing. In that case, the car rental request would show up on a FlowMark task list for the agent. Alternatively, the entire process may be completely automated. In either case, the car rental agent or activity program 432 processes the web client's car rental request and if the desired car is available, FlowMark database 438 will be updated to indicate that the car has been "reserved." These activities would be accomplished in process step 2030 of FIG. 20. If, however, the desired car is not available, a new activity program 432 may be initiated to look for a car in an alternate location (process step 2040 of FIG. 20) and create a request from a human car rental agent to transfer the desired automobile from another location to the desired location (process step 2050 of FIG. 20). Some of these activity programs 432 are described in greater detail below.

In this example, once the car rental agent has approved the request and transferred the vehicle to the desired location, the car rental agent will provide an input to FlowMark application 342 and update the activity program 432. Once the rental car has been reserved in the system, a different activity program 432 may be initiated to generate a confirmation number for the customer and process the confirmation transaction with the customer. Each activity program 432 is designed to be an independent process which executes to conclusion and then quits.

At this point, activity program 432 uses FlowMark APIs 436 to retrieve any input data from the FlowMark input data container. The FlowMark data container is a FlowMark function that is defined when a FlowMark process model 440 is built. The FlowMark data container is accessible via FlowMark APIs 436 and is used as a storage location to store and pass status and information from one activity program 432 to the next activity program 432 in process model 440. Then, activity program 432 opens a conversation with the web client by issuing an Open to WWW API 434 via connection 326. Activity program 432 also includes information such as the process instance being executed, activity name, and FlowMark userID. This information is transmitted to FMIG 430 by WWW API 434. FMIG 430 matches the Open API with the appropriate web client by locating the requested process instance name in the internal data cache. FMIG 430 then generates a "conversation identifier" for this transaction. FMIG 430 saves the conversation identifier in its internal cache and transmits the conversation identifier to WWW API 434 as part of a response message. WWW API 434 detaches from FMIG 430 and returns the conversation identifier to activity program 432. From this point on, the conversation identifier is included on all WWW API 434 submissions between this web client and all activity programs 432 necessary to process the web client's request. The conversation identifier remains valid until the conversation is terminated by a Close API issued by activity program 432.

After receiving the conversation identifier from FMIG 430, activity program 432 then issues a Receive to WWW API 434. The Receive API is a request to FMIG 430 to obtain data from the web client. In this case, FMIG 430 has data from the web client waiting to submit to activity program 432. This is the same web client data that CGI 420 sent to FMIG 430 earlier in the process. FMIG 430 sends the post data and environment data to the Receive WWW API 434, which relays the data to activity program 432. Activity program 432 takes the appropriate steps to process the data and fill the request.

At this point in the process, activity program 432 will also issue a Send to WWW API 434 that sends a reservation confirmation HTML screen to the web client at client workstation 210. The Send API generates a send request to FMIG 430 and sends the HTML data necessary to render the reservation confirmation screen. FMIG 430 matches the included conversation identifier with the web client handle (which are stored together in the internal data cache) and transmits the HTML data from activity program 432 along with the data type and the handle to CGI 420 which is still attached to FMIG 430 awaiting input. Activity programs 432 will generate the data type "HTML template" so that CGI 420 will be able to parse the original HTML template and replace the appropriate HTML substitution variables with the HTML data transmitted by activity programs 432. Alternatively, activity program 432 could transmit MIME, URL or HTML template data to CGI 420. At this point, CGI 420 detaches from FMIG 430 and starts processing the received data. FMIG 430 then responds to the WWW APIs 434 with an OK return code in a response message. WWW APIs 434 also detach from FMIG 430 and generate a return code to activity programs 432. In general, WWW APIs 434 detach from FMIG 430 after each WWW API 434 is invoked.

An example of the HTML code for the reservation confirmation template is shown in FIG. 10. Note that variable wf-act-outmsg is a substitution variable that will be replaced by the confirmation number in the HTML screen displayed by web browser 212. The HTML code after CGI 420 processes the data received from FMIG 430 is shown in FIG. 11. The HTML code shown in FIG. 11 is the code that web server application 222 will render and that web browser 212 displays on client workstation 210. Note that the HTML code in FIG. 11 contains the customer's reservation number. This time, since CGI 420 and the web client have already established a conversation, and since CGI 420 is still active from the first time it was invoked, there is no need to authenticate the web client. CGI 420 inserts the hidden variable, "wf-fmig-handle" along with the confirmation number nd also inserts the wf-fmig-key from the first HTML screen into the HTML code, which allows subsequent HTML pages to contain embedded data that authorizes the page to access FlowMark 450. The substitution of HTML variables demonstrated in this example can be extended to include substitution/replication of JAVAScript variables and parsing/inserting JAVAScript templates. The present invention is not limited to HTML variable substitution.

During the processing of the reservation confirmation template, activity program 432 has issued a Receive API to WWW APIs 434 which acts as a confirmation message for activity program 432 to ensure that the customer has received and viewed the confirmation number. The web client then clicks on the "submit" button when they have received and recorded their confirmation number. This data is transmitted, as before to web server application 222 along with the web userID and password which have been retained by web browser 212. Web server application 222 uses this information to once again authenticate the web client to CGI 420. Web server application 222 invokes CGI 420 with the same HTML code as before; <FORM ACTION="/cgi-prot/exmp5cgi.exe" METHOD="POST">. CGI 420 receives the post data from web browser 212. In this example, web browser 212 would format the data as "form-urlencoded media type." The data would appear similar to that shown in FIG. 12. The wf-cgi-submit value of 13 is a command to pass the data to activity program 432. FMIG 430 retrieves the wf-fmig-key and checks the key from the post data and web userID from the environment data to ensure that the web client is authorized. FMIG 430 matches the wf-fmig-handle with a conversation identifier from the internal data cache and checks to see if WWW API 434 has connected. If WWW API 434 has not yet connected, FMIG 430 will simply wait. CGI 420 remains connected to FMIG 430, waiting for a response. Once the Receive WWW API 434 has connected to FMIG 430, FMIG 430 uses the conversation identifier to match the Receive API to the appropriate web client and transmits the post data and environment data to WWW API 434 which, in turn passes this data to activity program 432. Activity program 432 processes the data and closes the conversation using the Close WWW API. The Close API is sent to FMIG 430 along with the conversation identifier, process instance name, and other pertinent data. FMIG 430 processes the close request and sends a response message to WWW APIs 434, which generate a return code to activity programs 432 to verify that the conversation has ended.

FMIG 430 then retrieves the stored variable values from the internal data cache and transmits the data to CGI 420. CGI 420 receives the data and variables and detaches from FMIG 430. CGI 420 then contacts web server application 222 and transmits the variables and data and directs the web server application to render the specified HTML to web browser 212.

At this point, interaction with the user regarding the car rental request has been completed. However, there are other activity programs 432 mentioned above which may have been completed in the interim. In addition, other processes may need to be completed and other activity programs 432 may be activated to accomplish these processes. In this example, one activity program 432 has been interacting with the user and has transmitted the data gathered from the user to the FlowMark data container. The data in the FlowMark data container is now the input for another activity program 432 in FlowMark process model 440. Some of the other activity programs 432 are described below.

Once any activity program 432 has finished operation, control passes back o the PEC. The PEC returns to FlowMark and FlowMark database 438 is updated to indicate one activity program 432 is completed and that the next activity program 432 to complete the process can be initiated. If the next activity program 432 is an automatically executing activity program 432, FlowMark 450 will create an instance of the activity in FlowMark database 438, check to see if the PEC is active, dispatch the activity to the PEC, and update FlowMark database 438 to indicate that the activity is running. The PEC starts the activity which has been registered as the next activity to run and the appropriate activity program 432 will run to completion.

As noted above, some of the activities required to process the car rental request may be modeled so as to require human interaction or intervention. For example, if necessary, a human car rental agent may be required to verify the reservation request for a car. Alternatively, it may be that the requested rental car is not available at the requested location and a human agent may be contacted to relocate an appropriate car from an alternative location. There are two possible outcomes of the web client's request for a car, either the car rental agency has the requested car available in the destination city on the requested dates or it does not. After a query to the FlowMark database has checked the availability, the correct activity program will be initiated.

In this example, the activity program 432 would generate an item for a FlowMark user's work list and the FlowMark user, in this case the car rental agent, will have to start the activity manually. The car rental agent would use web browser 212 to access their FlowMark runtime client web page. The HTML code necessary to generate an appropriate web page for the car rental agent would be similar to the code shown in FIG. 13. The car rental agent enters their key, selects "Work with Work Items" and clicks on the submit button. This radio button is associated with a specific HTML template, exmp5ewi.htm, because of the line of HTML in FIG. 13 that reads <INPUT TYPE="radio"NAME="wf-cgi-html" VALUE="/exm/html/exmp5ewi.htm" CHECKED>.

Once again, as previously described, web server application 222 receives the post data stream generated from web browser 212. Since CGI 420 is protected, another REALM request must be issued and answered. As before, the REALM request requires the car rental agent to input a password and userID. It should be noted that some future implementations of web browser 212 will most likely provide a mechanism for web browser 212 to insert some form of the authentication data into the data stream transmitted to web server application 222. All methods and techniques for gathering authentication data and transmitting it from web browser 212 to web server application 222 are within the scope of the present invention. In general, each web runtime client should know their userID and password on the web. In either case, web browser 212 will store the web userID and the password and send the information to web server application 222. As before, web server application 222 uses the web userID and the password to authenticate the web client and gain access to CGI 420. After the car rental agent has been authenticated, CGI 420 is invoked through the following HTML language from the example above:<FORM ACTION="/cgi-prot/exmp5cgi.exe" METHOD="POST">. CGI 420 receives the post data stream from web server application 222 via stdin. The data stream will typically look like the example shown in FIG. 14.

Because the submit value in the data stream is 0, CGI 420 will retrieve the specified template (exmp5ewi.htm), parse the template for HTML variables, and pass the parsed variables together with the environment data and control information to FMIG 430. An example of the HTML code used to generate the template before CGI 420 begins processing would like similar to FIGS. 15a and 15b.

FMIG 430 retrieves the car rental agent's key value (webfmagent) and web userID from the data stream and uses that information to find a FlowMark userID in FlowMark database 438 that the car rental agent is authorized to use. Since the car rental agent is not already logged into FlowMark 450, FMIG 430 logs into FlowMark 450 using the correlating FlowMark information in the FlowMark database 438. FMIG 430 uses FlowMark APIs 436 to retrieve the information associated with the car rental request that was input earlier by the user (i.e., wf-api-item-id, wf-api-item-descrip, wf-api-item-state, etc.) and formats the data into a message for CGI 420 which is still connected and waiting for data from FMIG 430. The data is passed through FMIG 430 to CGI 420. Once the data has been transmitted to CGI 420, CGI 420 disconnects from FMIG 430 and begins to process the received data. CGI 420 will take the information from FMIG 430 and process the variables, putting the information into the appropriate template that will be displayed on client workstation 210. An example of the HTML code after CGI 420 has completed processing the template is shown in FIGS. 16a, 16b, and 16c. The HTML code shown in FIGS. 16a, 16b, and 16c is used to render an output screen of work items on the work list for the car rental agent on client workstation 210. The car rental agent will view the list of work items generated by FlowMark 450 and displayed by web browser 212. The car rental agent will select one of the displayed work items and click on the "start work item" button and then on the "perform action" button. These actions by the car rental agent will generate a data stream to web server application 222 that includes the web userID and password information. The web userID and password have been retained by web server application 222 and the car rental agent need not re-enter this information. Web server application 222 uses the stored userID and the password to authenticate the car rental agent and gain access to CGI 420. Web server application 222 invokes CGI 420 with HTML code similar to that used before; <FORM ACTION="/cgi-prot/exmp5cgi.exe" METHOD="POST">and CGI 420 receives the post data from web browser 212. The post data will be received by CGI 420 via stdin and will be similar to that shown in FIG. 17.

In this case, since the car rental agent has submitted a request to start a work item, the value of the submit variable is equal to 3. CGI 420 will retrieve the specified template (in this case exmp5ewi.htm), parse the template for HTML variables, and pass these variables along with the data stream, environment data and control information to FMIG 430. While control passes to FMIG 430 at this point, CGI 420 remains connected to FMIG 430 and waits for data to be returned from FMIG 430. FMIG 430 authenticates the car rental agent using the variables transmitted by CGI 420. Since the car rental agent is already logged onto FlowMark 450, FMIG 430 need not log the car rental agent on again. FMIG 430 parses the data stream; sees the request to start a work item, (wf-api-item) and issues a FlowMark API 436 to start the processing the work item. Since the work item has been transmitted in a WWW context with HTML variables, FMIG 430 knows the activity program will use WWW APIS 434 to have a conversation with the web client. FMIG 430 will generate a handle for this web client and will enter the handle, process instance name, activity name, userID, etc. into the internal cache. FMIG 430 also saves the HTML variable information so that it can be restored later when the conversation has taken place. FMIG 430 will then wait for WWW APIs 434 to connect.

In response to the FlowMark API 436 that starts the requested work item (wf-api-item), FlowMark will create an instance of the activity in FlowMark database 438, check to see if the PEC is active, dispatch the activity to the PEC, and update FlowMark database 438 to indicate that the activity is running. The PEC will start the activity program 432 which has been registered to the next activity in this process. The activity program will then run to completion.

Activity program 432 will use FlowMark APIs to retrieve any input data from the FlowMark input data container. The activity program will open a conversation with the web client by issuing an Open API to WWW APIs 434. The Open API generates an Open request message for FMIG 430 and includes information such as the process instance and activity name and FlowMark userID. FMIG 430 takes this information, matches up the web client by finding the appropriate process instance, activity name, and userID in the internal data cache. As before, FMIG 430 also generates a conversation identifier and stores the identifier in its internal cache. FMIG 430 transmits the conversation identifier to WWW APIs 434 in a response message and the WWW APIs 434 detach from FMIG 430 and return the conversation identifier to activity program 432. From this point on, the conversation identifier is included in all WWW API 434 submissions dealing with this web client and this process instance. The conversation identifier remains valid until the conversation is closed. Activity program 432 issues a Send API to WWW APIs 434 to generate an HTML screen to the web client. Activity program 432 specifies the data type as HTML template so that CGI 420 knows to parse the template and replace the variables with the data sent by activity program 432. Activity programs 432 specify the location of the template and the text to be substituted for each variable.

The Send API generates a send request to FMIG 430 and sends the data. FMIG 430 matches the included conversation identifier with the appropriate web client and transmits the data from the activity program 432, the data type and the handle to the still-attached CGI 420. At this point, CGI 420 detaches from FMIG 430 and starts to process the received data. FMIG 430 responds to the WWW API 434 and WWW API 434 also detaches from FMIG 430. WWW APIs 434 send a return code to activity program 432. CGI 420 will use the data transmitted from FMIG 430 to create a screen containing information about cars that are available to fill the customer's request. In addition, since CGI 420 is in communication with web server application 222, CGI 420 will insert a hidden variable, the "wf-fmig-handle", and the wf-fmig key from the first HTML screen into the HTML code for the new screen. CGI 420 then parses the template and processes the "wf-"variables, filling information into the appropriate locations. The HTML code in the template file would look similar to the HTML code shown in FIG. 18. After CGI 420 finishes processing, the HTML code in the file would look like the HTML code in FIG. 19. This is the HTML code that web server application 222 will use to render the car rental agent's screen on client workstation 210. In the meantime, activity program 432 has issued a Receive WWW API 434 to receive the data from the web client. The car rental agent selects which car to reserve in order to fill this car rental request and clicks on the "submit process" button. The communication process between web browser 212, web server application 222, CGI 420, FMIG 430 and FlowMark 450 takes place as explained above. Eventually, the selected car will be updated in FlowMark database 438 and the conversation will be terminated. Since the car rental reservation process instance is now complete, FlowMark 450 removes the process instance from FlowMark database 438.

A similar sequence of events would transpire for the situation where no rental car is available at the requested location. The only difference is that in this case, the car rental agent's screen would not contain information on available cars since there is no qualifying match for a car at the requested city. The screen would contain an option to move a car that matches the customer's request from an alternative location.

Meanwhile, activity program 432 has issued a Disconnect API. The Disconnect API generates a disconnect request message for FMIG 430 and includes information such as the conversation identifier, process instance, activity name and FlowMark userID. FMIG 430 takes this information, locates the corresponding entry in its internal cache and records all of this information along with the "disconnect" status for activity program 432. FMIG 430 transmits an OK response message to WWW API 434, which detaches from FMIG 430 and sends a return code to activity program 432. Activity program 432 checks the return code and verifies that the disconnect API was successfully recorded. Activity program 432 saves the conversation identifier and status information in a local database for restoring the disconnected process at a later time. Since this activity has progressed as far as possible without actually completing, control is returned to the PEC. Since the activity did not complete, the PEC will update FlowMark database 438 to show that the activity is ready to be started again. As far as FlowMark is concerned, this is a "manual start" activity. Since this activity is ready and manual start, FMIG 430 can issue a FlowMark API 436 at a later time to re-start the activity when the data is available from the car rental agent. The car rental agent selects that they wish to move a car from an alternate location to fill the car rental request and clicks on "submit." The process of data transfer and web client authentication proceed as previously described. This time, when FMIG 430 checks the conversation identifier, it will notice that the status of the activity is "disconnected." FMIG 430 issues FlowMark API 436 to re-start the activity program 432. Activity program 432 is thus re-started FlowMark 450 creates the process instance and updates database 438 as before. The PEC starts the activity program 432 and the necessary data is transferred from FMIG 430. Activity program 432 can now run to completion. It is possible to determine which rental car should be moved from which location and to transmit this data from the car rental agent to FlowMark 450 by a similar sequence and series of communications.

While the invention has been particularly shown and described with reference to preferred embodiments thereof, it will be understood by those skilled in the art that various changes in form and details may be made therein without departing from the spirit and scope of the invention.

We claim:

1. A computer system for communicating between a plurality of web browsers and a software application over the World-Wide Web comprising:

at least one Central Processing Unit (CPU);
 a memory coupled to the CPU; and
 a transaction support mechanism, the transaction support mechanism residing in the memory and being executed by one of the at least one CPU, wherein the transaction support mechanism is capable of receiving and transmitting data to and from the plurality of web browsers, the transaction support mechanism using an identifier mechanism to identify and track the data, the transaction support mechanism communicating with a native interface to the software application.

2. The computer system of claim 1 wherein the transaction support mechanism comprises:

an application gateway in communication with the plurality of web browsers and the software application, the application gateway residing in the memory and being executed by at least one of the plurality of CPUs, the application gateway including the identifier mechanism, the identifier mechanism generating an identifier for each of the plurality of web browsers and routing data from the software application to the selected one of the plurality of web browsers that correspond to the identifier.

3. The computer system of claim 2 wherein the application gateway processes data received from the plurality of web browsers and processes data received from the application program.

4. The computer system of claim 2 wherein the software application is a process engineering software application.

5. The computer system of claim 2 wherein the software application is a FlowMark software application.

6. The computer system of claim 2 further comprising at least one activity program interface (API) in communication with at least one activity program that executes under the direction of the software application, the at least one activity program interface communicating between the at least one activity program and the application gateway.

7. A computer system for communicating between a plurality of web browsers and a software application over the World-Wide Web comprising:

a plurality of Central Processing Units (CPUs);

a memory coupled to the plurality of CPUs; each of the plurality of web browsers residing in the memory and being executed by at least one of the plurality of CPUs;

a web server application in communication with at least one of the plurality of web browsers, the web server application residing in the memory and being executed by at least one of the plurality of CPUs;

the software application residing in the memory and being executed by at least one of the plurality of CPUs; and an application gateway in communication with the web server application and the software application, the application gateway residing in the memory and being executed by at least one of the plurality of CPUs, the application gateway including:

an identifier mechanism, the identifier mechanism generating an identifier for each of the plurality of web browsers and routing data from the software application to the selected one of the plurality of web browsers that correspond to the identifier; and a plurality of world-wide web application program interfaces (WWW API's) that can be invoked by the software application to converse with the plurality of web browsers during the execution of at least one process requested by at least one of the plurality of web browsers.

8. The computer system of claim 7 wherein the application gateway processes environment data received from the web server application and processes data received from at least one of a plurality of application program interfaces (API's) residing in the software application and/or from at least one of a plurality of activity programs residing in the software application.

9. The computer system of claim 7 wherein the software application is a process engineering software application.

10. The computer system of claim 7 wherein the software application is a FlowMark software application.

11. The computer system of claim 8, wherein the plurality of WWW API's comprise:

an Open API for opening a conversation between the software application and one of the at least one of the plurality of web browsers;

a Close API for terminating a conversation between the software application and one of the at least one of the plurality of web browsers;

a Send API for sending data from one of the at least one of a plurality of activity programs residing in the software application to one of the plurality of web browsers; and a Receive API for obtaining data from one of the plurality of web browsers at the request of one of the at least one of a plurality of activity programs residing in the software application.

12. The computer system of claim 7 wherein the web server application comprises:

an authenticator, the authenticator determining from authentication data passed from one of the plurality of web browsers whether the selected web browser is authorized to access the web server application; and wherein the web server processes data received from the plurality of web browsers and data received from the application gateway.

13. The computer system of claim 7 wherein the web browser is executed on a client workstation by at least one of the plurality of CPUs.

14. The computer system of claim 7 wherein the web server application is executed on a web server computer by at least one of the plurality of CPUs.

15. The computer system of claim 14 wherein the application gateway is executed on the web server computer by at least one of the plurality of CPUs.

16. The computer system of claim 7 wherein the application gateway is executed on a first computer by at least one of the plurality of CPUs.

17. The computer system of claim 16 wherein the software application is executed on a second computer by at least one of the plurality of CPUs.

18. The computer system of claim 17 wherein the application gateway is executed on the second computer by at least one of the plurality of CPUs.

19. A program product for communicating between a plurality of web browsers and a software application, the program product comprising:

(1) an application gateway in communication with the plurality of web browsers and the software application, the application gateway comprising:

an identifier mechanism, the identifier mechanism generating an identifier for each of the plurality of web browsers and routing data from the software application to a selected one of the plurality of web browsers that correspond to the identifier; and a mechanism for communicating with a native interface to the software application; and (2) computer-readable signal bearing media bearing the application gateway.

20. The program product of claim 19 wherein the computer-readable signal bearing media comprises recordable media.

21. The program product of claim 19 wherein the computer-readable signal bearing media comprises transmission media.

22. The program product of claim 19 wherein the software application is a process engineering software application.

23. The program product of claim 19 wherein the software application is a FlowMark software application.

24. The program product of claim 19 further comprising at least one activity program interface (API) in communication with at least one activity program that executes under the direction of the software application, the at least one activity program interface communicating between the at least one activity program and the application gateway.

25. A computer-implemented method for communicating between a plurality of web browsers and a software application over the World-Wide Web, the method comprising the steps of:

provide a plurality of Central Processing Units (CPUs);

providing a memory coupled to the plurality of CPUs;

executing at least one of the plurality of web browsers residing in the memory by at least one of the plurality of CPUs;

providing a web server application residing in the memory and being executed by at least one of the plurality of CPUs;

executing the software application residing in the memory by at least one of the plurality of CPUs;

providing an application gateway having a plurality of world-wide web application program interfaces (WWW API's) for communicating with the software application, the application gateway residing in the memory and being executed by at least one of the plurality of CPUs;

a selected one of the plurality of web browsers initiating an access to the software application by sending authentication data and environment data to the web server application;

determining whether the authentication data authorizes the selected web browser to access the web server application;

processing the environment data if the authentication data authorizes the selected web browser to access the web server application;

outputting the processed environment data to the application gateway;

generating an identifier corresponding to the selected web browser and a desired process to be executed by the software application;

outputting the processed environment data, the identifier, and the desired process to be executed to the software application; and executing the desired process by the software application, the execution invoking at least one of the plurality of WWW API's;

returning at least one result of executing the desired process and/or at least one request for more information to the application gateway with the identifier;

determining based on the identifier which of the plurality of browsers should be sent the at least one result and/or the at least one request for more information;

sending data from the application gateway to the web server application, the data comprising the at least one result and/or the at least one request for more information; and sending data from the web server to the selected web browser corresponding to the identifier, the data comprising the at least one result and/or the at least one request for more information.

26. The method of claim 25 wherein the software application is a process engineering software application.

27. The method of claim 25 wherein the software application is a FlowMark software application.

28. A system for communicating between a web browser and a software application over the World-Wide Web comprising:

a client workstation running the web browser;

a web server computer running a web server application;

a first computer running an application gateway;

a second computer running the software application;

a communication mechanism between the web browser and the web server application which allows data to be transmitted between the web browser and the web server application;

a communication mechanism between the web server application and the application gateway which allows data to be transmitted between the web server application and the application gateway;

a communication mechanism between the application gateway and the software application which allows data to be transmitted between the application gateway and the software application; and a plurality of world-wide web application programming interfaces (WWW API's) residing in the application gateway that are invoked by the software application to communicate with the web browser over the World-Wide Web.

29. The system of claim 28 wherein the software application is a process engineering software application.

30. The method of claim 25 wherein the software application is a FlowMark software application.

31. The system of claim 28 wherein the web server computer comprises the first computer.

32. The system of claim 28 wherein the first computer comprises the second computer.

33. A program product for communicating between a plurality of web browsers and a FlowMark software application, the program product comprising:

(1) an application gateway capable of transmitting input data to the FlowMark software application and receiving FlowMark output data from the FlowMark software application, the application gateway comprising:

an identifier mechanism, the identifier mechanism capable of generating an identifier from environment data received from a selected web browser, the identifier mechanism capable of using the identifier in the FlowMark output data to match the FlowMark output data to one of the plurality of web browsers;

wherein the application gateway is capable of receiving input data from the selected web browser, and in response thereto, the application gateway is capable of transmitting the identifier as part of the FlowMark input data; and wherein the application gateway is capable of receiving the FlowMark output data from the FlowMark application, the FlowMark output data including the identifier to identify the web browser that will receive the FlowMark output data;

(2) at least one world-wide web application program interface (WWW API) residing in the application gateway, the at least one WWW API capable of communicating with at least one activity program that executes under the direction of the FlowMark software application, the at least one WWW API communicating between the at least one activity program and the application gateway;

(3) a common gateway interface (CGI) that is capable of receiving a processing information from the plurality of web browsers; and (4) computer-readable signal bearing media bearing the application gateway, the at least one WWW API, and the common gateway interface.

34. The program product of claim 19 wherein the computer-readable signal bearing media comprises recordable media.

35. The program product of claim 19 wherein the computer-readable signal bearing media comprises transmission media.

36. A method of communicating between a web browser and a FlowMark application overt the WWW, the method comprising the steps of:

providing a client workstation running the web browser;

providing a web server computer running a web server application;

providing a first computer system running an application gateway;

providing a second computer system running the FlowMark application;

providing a first communication mechanism between the web browser and the web server application which allows data to be transmitted between the web browser and the web server application;

providing a second communication mechanism between the web server application and the application gateway which allows data to be transmitted between the web server application and the application gateway;

providing a third communication mechanism between the application gateway and the FlowMark application which allows data to be transmitted between the application gateway and the FlowMark application;

providing a plurality of world-wide web application programming interfaces (WWW API's) residing in the application gateway that allow the web browser to communicate with the software application over the WWW;

the web browser initiating an access to the FlowMark Application by sending authentication data and environment data to the web server application via the first communication mechanism;

the web server application determining whether the authentication data authorizes the selected web browser to access the web server application;

the web server application processing the environment data if the authentication data authorizes the selected web browser to access the web server application;

the web server application outputting the processed environment data to the application gateway via the second communication mechanism;

the application gateway generating an identifier corresponding to the selected web browser and a desired process to be executed by the FlowMark application;

the application gateway outputting the identifier and the desired process to the FlowMark application via the third communication mechanism;

the FlowMark application executing the desired process the execution invoking at least one of the plurality of WWW API's;

the FlowMark application returning at least one result of executing the desired process and/or at least one request for more information to the application gateway with the identifier via the third communication mechanism;

the application gateway determining based on the identifier which of the plurality of browsers should be sent the at least one result and/or the at least one request for more information;

the application gateway sending the at least one result and/or the at least one request for more information to the web server application via the second communication mechanism; and the web server application sending the at least one result and/or the at least one request for more information to the selected one web browser corresponding to the identifier via the first communication mechanism.

* * * * *